US012587903B2

(12) United States Patent
Liu et al.

(10) Patent No.: US 12,587,903 B2
(45) Date of Patent: Mar. 24, 2026

(54) NETWORK CODING IN RADIO LINK CONTROL LAYER FOR MULTICAST/BROADCAST TRANSMISSIONS

(71) Applicant: QUALCOMM Incorporated, San Diego, CA (US)

(72) Inventors: Kangqi Liu, San Diego, CA (US); Ruiming Zheng, Beijing (CN); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 18/565,867

(22) PCT Filed: Aug. 4, 2021

(86) PCT No.: PCT/CN2021/110442
§ 371 (c)(1),
(2) Date: Nov. 30, 2023

(87) PCT Pub. No.: WO2023/010306
PCT Pub. Date: Feb. 9, 2023

(65) Prior Publication Data
US 2024/0267791 A1 Aug. 8, 2024

(51) Int. Cl.
*H04W 28/06* (2009.01)
*H04L 1/08* (2006.01)
*H04W 4/06* (2009.01)

(52) U.S. Cl.
CPC ............. *H04W 28/065* (2013.01); *H04L 1/08* (2013.01); *H04W 4/06* (2013.01)

(58) Field of Classification Search
CPC .......... H04W 28/065; H04W 4/06; H04L 1/08
See application file for complete search history.

(56) References Cited

U.S. PATENT DOCUMENTS 12,367,261 B1 * 7/2025 Tam ...................... G06V 20/62
12,402,813 B2 * 9/2025 Hayter ................... A61B 5/002
(Continued)

OTHER PUBLICATIONS

International Search Report and Written Opinion—PCT/CN2021/110442—ISA/EPO—Jan. 31, 2022.
(Continued)

*Primary Examiner* — Joseph Suh
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, configuration information indicating that network coding is enabled for initial transmissions associated with a multicast/broadcast service (MBS) and indicating that network coding is enabled for retransmissions associated with the MBS. The UE may receive, via a multicast traffic channel or a dedicated traffic channel, an initial transmission associated with the MBS, wherein the initial transmission is associated with a first set of encoded packets. The UE may transmit a radio link control (RLC) status feedback message associated with the initial transmission. The UE may receive, via the multicast traffic channel or the dedicated traffic channel, a retransmission associated with the initial transmission, wherein the retransmission is associated with a second set of encoded packets. Numerous other aspects are described.

30 Claims, 16 Drawing Sheets

(56) References Cited

U.S. PATENT DOCUMENTS

| | | | |
|---|---|---|---|
| 12,414,092 B2 * | 9/2025 | Bin Sediq | H04W 72/0446 |
| 12,426,010 B2 * | 9/2025 | Su | H04W 72/0446 |
| 2014/0133382 A1 | 5/2014 | Shin et al. | |
| 2017/0214489 A1 | 7/2017 | Jiang et al. | |
| 2023/0246781 A1 * | 8/2023 | Kim | H04B 7/06 |
| | | | 370/329 |
| 2025/0203516 A1 * | 6/2025 | Nam | H04B 17/328 |
| 2025/0216934 A1 * | 7/2025 | Kim | G06V 20/46 |

OTHER PUBLICATIONS

Lv Z., et al., "A Practical HARQ Scheme with Network Coding for LTE—A Broadcasting System", Wireless Communications Signal Processing (WCSP), 2012 International Conference on IEEE, Oct. 25, 2012 (Oct. 25, 2012), pp. 1-6, XP032428263, DOI: 10.1109/WCSP.2012.6542816, ISBN: 978-1-4673-5830-9, section II.

* cited by examiner

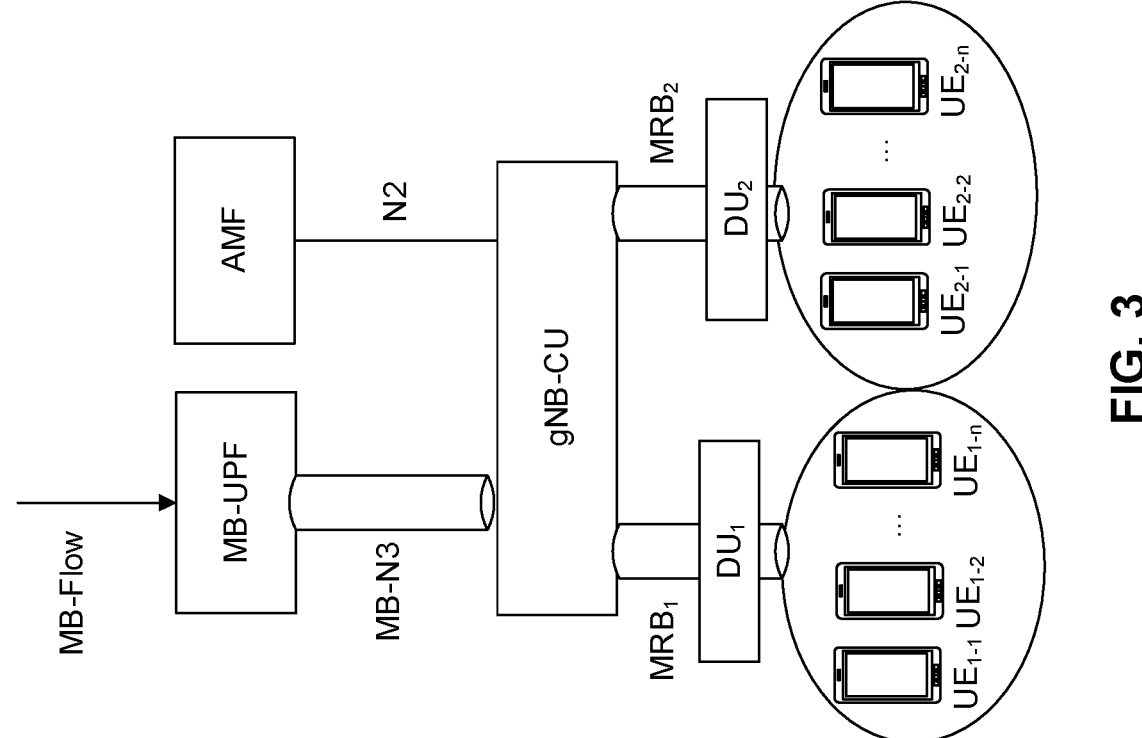
FIG. 3

700

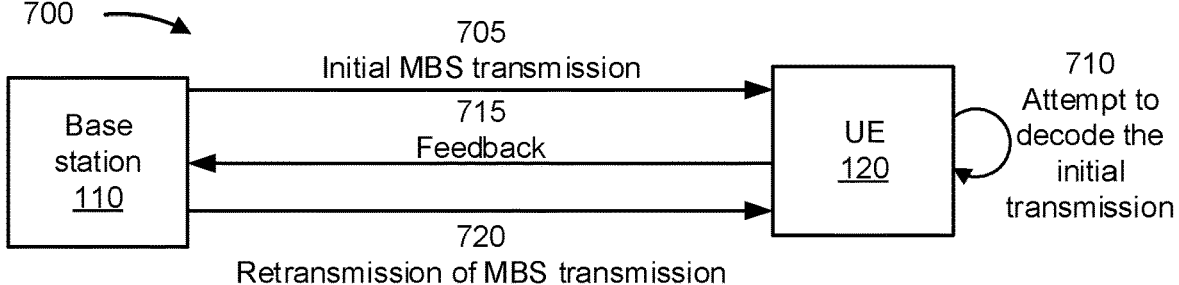

705
Initial MBS transmission

715
Feedback

720
Retransmission of MBS transmission

Base station 110

UE 120

710
Attempt to decode the initial transmission

110/ 120

QoS Flows

SDAP
QoS flow handling

Radio Bearers

PDCP
ROHC

Security

RLC Channels

RLC
RLC entity with network coding 705        720
MBTCH        DTCH

Logical Channels

Scheduling        Scheduling

MAC
Multiplexing        Multiplexing

HARQ        HARQ

Transport Channels

FIG. 7A

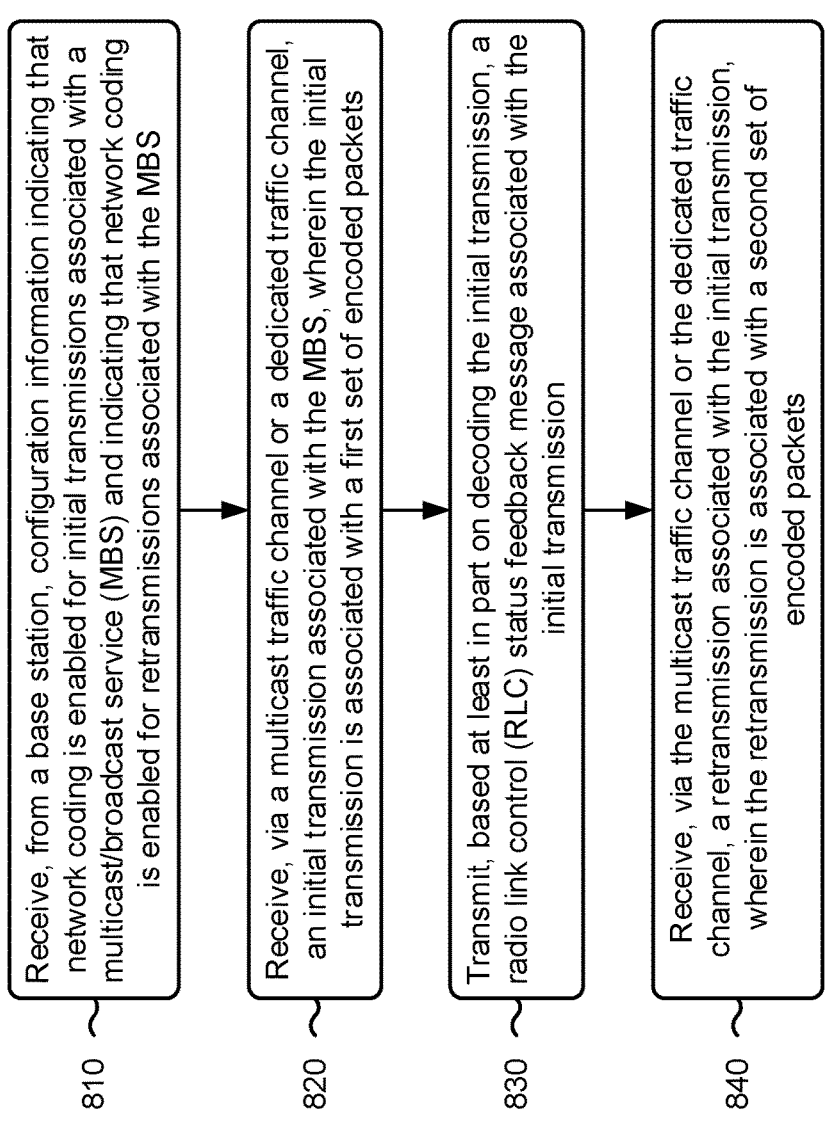

Receive, from a base station, configuration information indicating that network coding is enabled for initial transmissions associated with a multicast/broadcast service (MBS) and indicating that network coding is enabled for retransmissions associated with the MBS

810

Receive, via a multicast traffic channel or a dedicated traffic channel, an initial transmission associated with the MBS, wherein the initial transmission is associated with a first set of encoded packets

820

Transmit, based at least in part on decoding the initial transmission, a radio link control (RLC) status feedback message associated with the initial transmission

830

Receive, via the multicast traffic channel or the dedicated traffic channel, a retransmission associated with the initial transmission, wherein the retransmission is associated with a second set of encoded packets

NETWORK CODING IN RADIO LINK CONTROL LAYER FOR MULTICAST/BROADCAST TRANSMISSIONS

CROSS-REFERENCE TO RELATED APPLICATION

This application is a 371 national stage of Patent Cooperation Treaty (PCT) Application No. PCT/CN2021/110442 filed on Aug. 4, 2021, entitled "NETWORK CODING IN RADIO LINK CONTROL LAYER FOR MULTICAST/ BROADCAST TRANSMISSIONS," which is hereby expressly incorporated by reference herein.

FIELD OF THE DISCLOSURE

Aspects of the present disclosure generally relate to wireless communication and to techniques and apparatuses for network coding in a radio link control (RLC) layer for multicast/broadcast transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive, from a base station, configuration information indicating that network coding is enabled for initial transmissions associated with a multicast/broadcast service (MBS) and indicating that network coding is enabled for retransmissions associated with the MBS. The one or more processors may be configured to receive, via a multicast traffic channel or a dedicated traffic channel, an initial transmission associated with the MBS, wherein the initial transmission is associated with a first set of encoded packets. The one or more processors may be configured to transmit, based at least in part on decoding the initial transmission, a radio link control (RLC) status feedback message associated with the initial transmission. The one or more processors may be configured to receive, via the multicast traffic channel or the dedicated traffic channel, a retransmission associated with the initial transmission, wherein the retransmission is associated with a second set of encoded packets.

Some aspects described herein relate to a base station for wireless communication. The base station may include a memory and one or more processors coupled to the memory. The one or more processors may be configured to transmit configuration information indicating that network coding is enabled for initial transmissions associated with an MBS and indicating that network coding is enabled for retransmissions associated with the MBS. The one or more processors may be configured to transmit, via a multicast traffic channel or a dedicated traffic channel, an initial transmission associated with the MBS, wherein the initial transmission includes a first set of encoded packets. The one or more processors may be configured to receive an RLC status feedback message associated with the initial transmission. The one or more processors may be configured to transmit, via the multicast traffic channel or the dedicated traffic channel, a retransmission associated with the initial transmission, wherein the retransmission includes a second set of encoded packets.

Some aspects described herein relate to a method of wireless communication performed by a UE. The method may include receiving, from a base station, configuration information indicating that network coding is enabled for initial transmissions associated with an MBS and indicating that network coding is enabled for retransmissions associated with the MBS. The method may include receiving, via a multicast traffic channel or a dedicated traffic channel, an initial transmission associated with the MBS, wherein the initial transmission is associated with a first set of encoded packets. The method may include transmitting, based at least in part on decoding the initial transmission, an RLC status feedback message associated with the initial transmission. The method may include receiving, via the multicast traffic channel or the dedicated traffic channel, a retransmission associated with the initial transmission, wherein the retransmission is associated with a second set of encoded packets.

Some aspects described herein relate to a method of wireless communication performed by a base station. The method may include transmitting configuration information indicating that network coding is enabled for initial transmissions associated with an MBS and indicating that network coding is enabled for retransmissions associated with the MBS. The method may include transmitting, via a multicast traffic channel or a dedicated traffic channel, an initial transmission associated with the MBS, wherein the initial transmission includes a first set of encoded packets. The method may include receiving an RLC status feedback message associated with the initial transmission. The method may include transmitting, via the multicast traffic channel or the dedicated traffic channel, a retransmission associated with the initial transmission, wherein the retransmission includes a second set of encoded packets.

Some aspects described herein relate to a non-transitory computer-readable medium that stores a set of instructions for wireless communication by a UE. The set of instructions, when executed by one or more processors of the UE, may cause the UE to receive, from a base station, configuration information indicating that network coding is enabled for initial transmissions associated with an MBS and indicating that network coding is enabled for retransmissions associated with the MBS. The set of instructions, when executed by one or more processors of the UE, may cause the UE to receive, via a multicast traffic channel or a dedicated traffic channel, an initial transmission associated with the MBS, wherein the initial transmission is associated with a first set of encoded packets. The set of instructions, when executed by one or more processors of the UE, may cause the UE to transmit, based at least in part on decoding the initial transmission, an RLC status feedback message associated with the initial transmission. The set of instructions, when executed by one or more processors of the UE, may cause the UE to receive, via the multicast traffic channel or the dedicated traffic channel, a retransmission associated with the initial transmission, wherein the retransmission is associated with a second set of encoded packets.

Some aspects described herein relate to a non-transitory computer-readable medium that stores a set of instructions for wireless communication by a base station. The set of instructions, when executed by one or more processors of the base station, may cause the base station to transmit configuration information indicating that network coding is enabled for initial transmissions associated with an MBS and indicating that network coding is enabled for retransmissions associated with the MBS. The set of instructions, when executed by one or more processors of the base station, may cause the base station to transmit, via a multicast traffic channel or a dedicated traffic channel, an initial transmission associated with the MBS, wherein the initial transmission includes a first set of encoded packets. The set of instructions, when executed by one or more processors of the base station, may cause the base station to receive an RLC status feedback message associated with the initial transmission. The set of instructions, when executed by one or more processors of the base station, may cause the base station to transmit, via the multicast traffic channel or the dedicated traffic channel, a retransmission associated with the initial transmission, wherein the retransmission includes a second set of encoded packets.

Some aspects described herein relate to an apparatus for wireless communication. The apparatus may include means for receiving, from a base station, configuration information indicating that network coding is enabled for initial transmissions associated with an MBS and indicating that network coding is enabled for retransmissions associated with the MBS. The apparatus may include means for receiving, via a multicast traffic channel or a dedicated traffic channel, an initial transmission associated with the MBS, wherein the initial transmission is associated with a first set of encoded packets. The apparatus may include means for transmitting, based at least in part on decoding the initial transmission, an RLC status feedback message associated with the initial transmission. The apparatus may include means for receiving, via the multicast traffic channel or the dedicated traffic channel, a retransmission associated with the initial transmission, wherein the retransmission is associated with a second set of encoded packets.

Some aspects described herein relate to an apparatus for wireless communication. The apparatus may include means for transmitting configuration information indicating that network coding is enabled for initial transmissions associated with an MBS and indicating that network coding is enabled for retransmissions associated with the MBS. The apparatus may include means for transmitting, via a multicast traffic channel or a dedicated traffic channel, an initial transmission associated with the MBS, wherein the initial transmission includes a first set of encoded packets. The apparatus may include means for receiving an RLC status feedback message associated with the initial transmission. The apparatus may include means for transmitting, via the multicast traffic channel or the dedicated traffic channel, a retransmission associated with the initial transmission, wherein the retransmission includes a second set of encoded packets.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of a multicast broadcast service architecture, in accordance with the present disclosure.

FIGS. 7A-7F are diagrams illustrating an example associated with network coding in a radio link control (RLC) layer for multicast/broadcast transmissions, in accordance with the present disclosure.

FIGS. 8 and 9 are diagrams illustrating example processes associated with network coding in an RLC layer for multicast/broadcast transmissions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
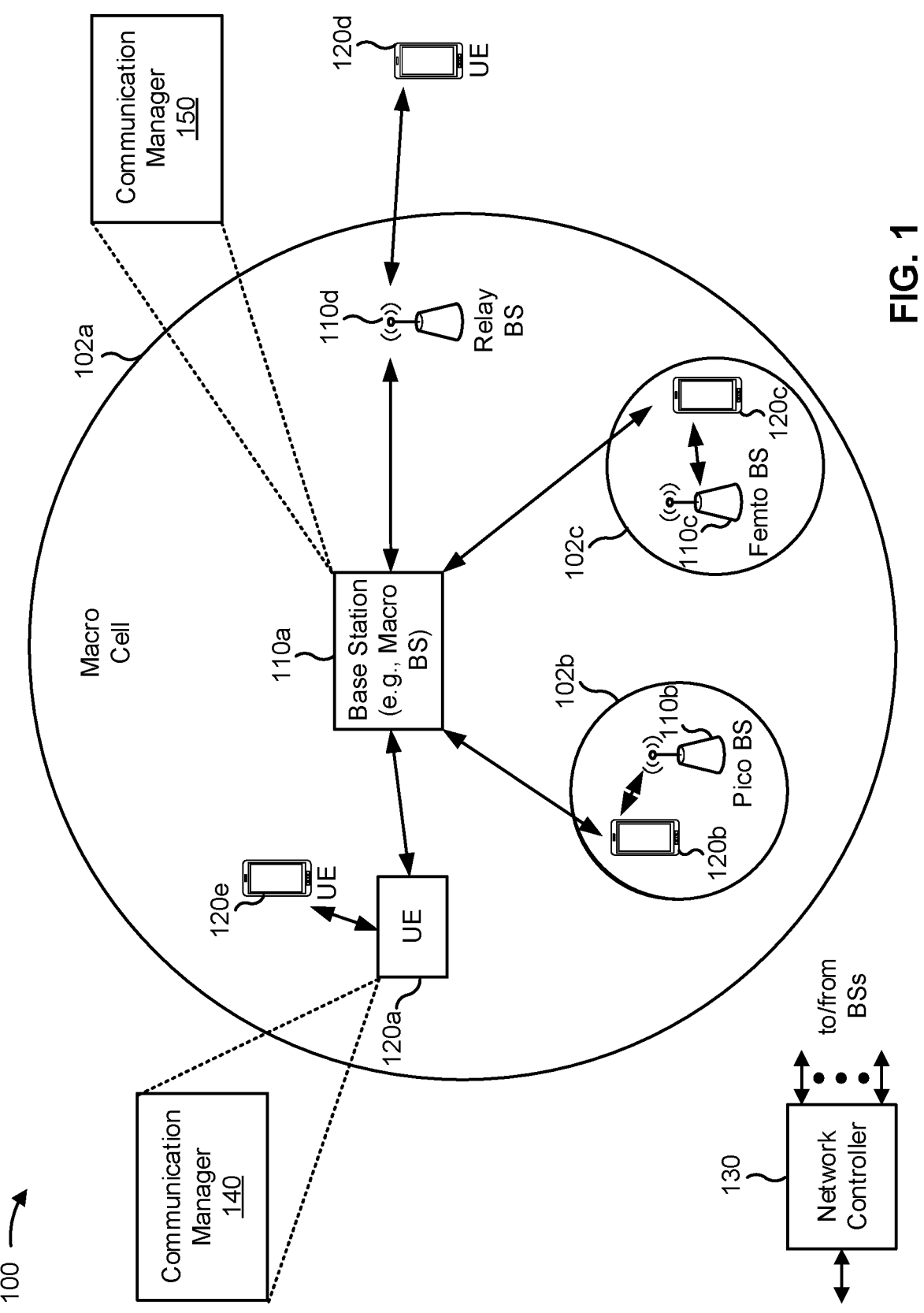
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, configuration information indicating that network coding is enabled for initial transmissions associated with a multicast/broadcast service (MBS) and indicating that network coding is enabled for retransmissions associated with the MBS; receive, via a multicast traffic channel or a dedicated traffic channel, an initial transmission associated with the MBS, wherein the initial transmission is associated with a first set of encoded packets; transmit, based at least in part on decoding the initial transmission, a radio link control (RLC) status feedback message associated with the initial transmission; and/or receive, via the multicast traffic channel or the dedicated traffic channel, a retransmission associated with the initial transmission, wherein the retransmission is associated with a second set of encoded packets. Additionally, or alternatively, the communication manager 140 may perform one or more other operations described herein.

In some aspects, the base station 110 may include a communication manager 150. As described in more detail elsewhere herein, the communication manager 150 may transmit configuration information indicating that network coding is enabled for initial transmissions associated with an MBS and indicating that network coding is enabled for retransmissions associated with the MBS; transmit, via a multicast traffic channel or a dedicated traffic channel, an initial transmission associated with the MBS, wherein the initial transmission includes a first set of encoded packets; receive, based at least in part on decoding the initial transmission, an RLC status feedback message associated with the initial transmission; and/or transmit, via the multicast traffic channel or the dedicated traffic channel, a retransmission associated with the initial transmission, wherein the retransmission includes a second set of encoded packets. Additionally, or alternatively, the communication manager 150 may perform one or more other operations described herein.

As indicated above, FIG. 1 is provided as an example. Other examples may differ from what is described with regard to FIG. 1.

Figure 2:
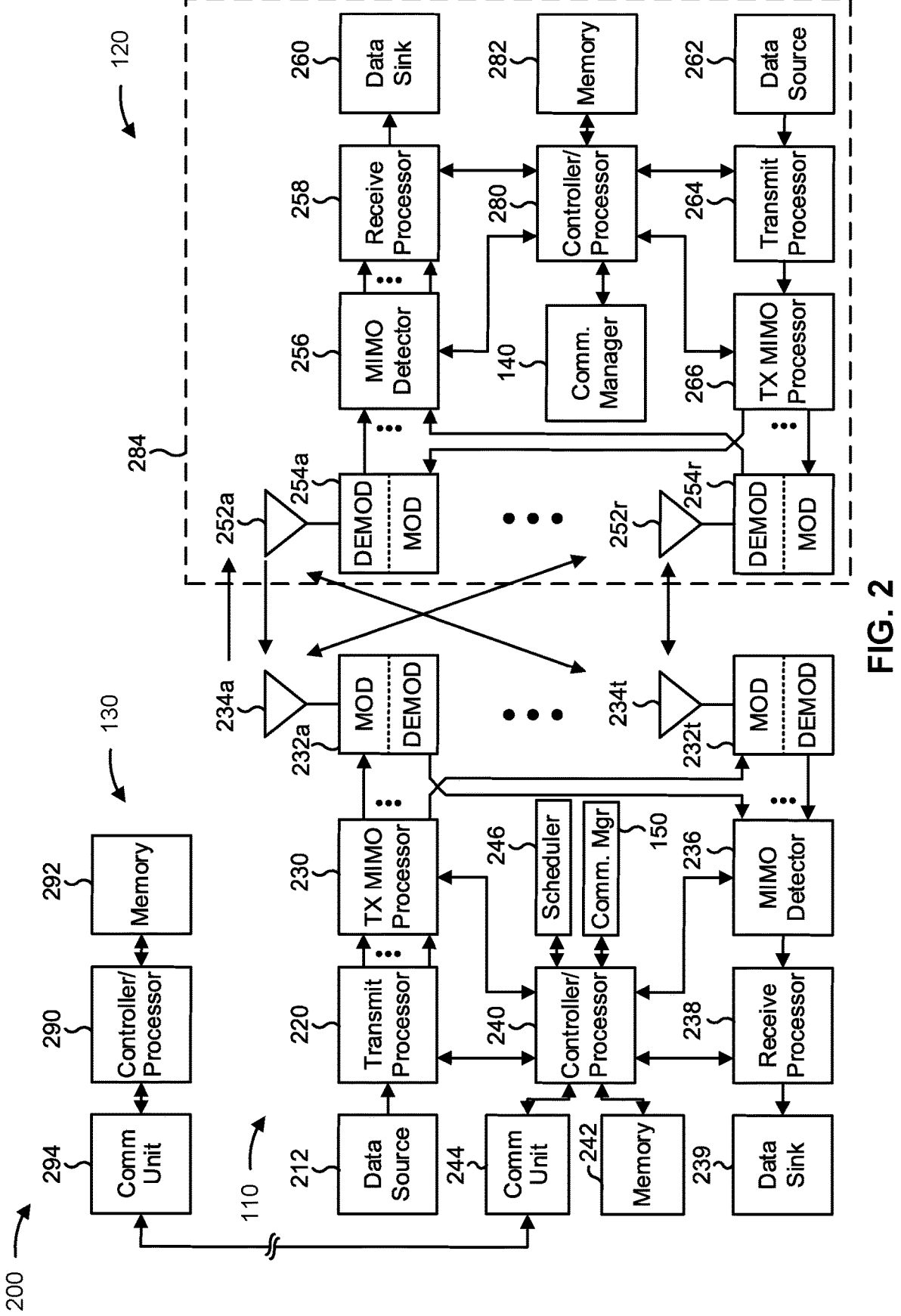
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-7F, 8, and 9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-7F, 8, and 9).

The controller/processor 240 of the base station 110, the controller/processor 280 of the UE 120, and/or any other component(s) of FIG. 2 may perform one or more techniques associated with network coding in an RLC layer for multicast/broadcast transmissions, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a base station, configuration information indicating that network coding is enabled for initial transmissions associated with an MBS and indicating that network coding is enabled for retransmissions associated with the MBS; means for receiving, via a multicast traffic channel or a dedicated traffic channel, an initial transmission associated with the MBS, wherein the initial transmission is associated with a first set of encoded packets; means for transmitting, based at least in part on decoding the initial transmission, an RLC status feedback message associated with the initial transmission; and/or means for receiving, via the multicast traffic channel or the dedicated traffic channel, a retransmission associated with the initial transmission, wherein the retransmission is associated with a second set of encoded packets. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting configuration information indicating that network coding is enabled for initial transmissions associated with an MBS and indicating that network coding is enabled for retransmissions associated with the MBS; means for transmitting, via a multicast traffic channel or a dedicated traffic channel, an initial transmission associated with the MBS, wherein the initial transmission includes a first set of encoded packets; means for receiving, based at least in part on decoding the initial transmission, an RLC status feedback message associated with the initial transmission; and/or means for transmitting, via the multicast traffic channel or the dedicated traffic channel, a retransmission associated with the initial transmission, wherein the retransmission includes a second set of encoded packets. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of a multicast broadcast service architecture, in accordance with the present disclosure. In some aspects, the multicast broadcast service architecture may be deployed in a wireless network (e.g., wireless network 100) to support multicast or broadcast services to simultaneously disseminate data, such as emergency alerts or audio or video content, among many other possibilities, to multiple UEs that may be located in the same or different cells. In general, because multicast broadcast operations enable multiple UEs to receive the same data at substantially the same time, multicast operations can significantly reduce network overhead relative to unicast operations in which a particular transmission is received by only one UE.

In an LTE network, multicast broadcast operations may be supported using enhanced multimedia broadcast/multicast service (eMBMS), single-cell point-to-multipoint (SC-PTM) services, multimedia broadcast multicast service over single frequency network (MBSFN), and/or enhanced TV (EnTV), among other examples. For example, in eMBMS, multicast data is transmitted in multiple cells to a group of UEs located in a particular area. In SC-PTM, multicast data is transmitted in a particular cell and the multicast data is received by a group of UEs that are located in the particular cell. In an NR network, a UE may receive multicast broadcast services in mixed mode or broadcast mode. For example, in mixed mode, a UE in a radio resource control (RRC) connected mode may receive multicast broadcast service using a multicast broadcast radio bearer (MRB) or a dedicated radio bearer (DRB). In broadcast mode, a UE may receive multicast broadcast service using an MRB in an RRC connected mode, an RRC idle mode, or an RRC inactive mode.

As shown in FIG. 3, the multicast broadcast service architecture may include a multicast broadcast user plane function (MB-UPF) that receives (e.g., from an application server) a multicast broadcast (MB) flow including content to be multicasted and/or broadcasted. As further shown, the multicast broadcast service architecture may include a centralized base station unit (gNB-CU) that receives the MB flow and a temporary mobile group identity (TMGI) associated with the MB flow from the MB-UPF over an MB-N3 tunnel (e.g., a user plane interface for delivering the MB flow and the corresponding TMGI using a general packet radio service tunneling protocol (GTP)). Furthermore, the gNB-CU may communicate with an access and mobility management function (AMF) that manages UE network registration, manages mobility, maintains non-access stratum (NAS) signaling connections, and/or manages UE registration procedures, among other examples. For example, the gNB-CU may communicate with the AMF over an N2 interface that enables control signaling to establish and/or modify the MB flow and/or the TMGI.

In some aspects, the gNB-CU may map the MB flow received from the MB-UPF to an MRB and/or a DRB based at least in part on the TMGI associated with the MB flow, and the gNB-CU may forward the MB flow to a distributed unit (DU) that may include one or more TRPs, which may multicast or broadcast the content included in the MB flow to one or more UEs via an MRB. Additionally, or alternatively, the DU may transmit the content included in the MB flow to one or more UEs via a DRB. In this way, the multicast broadcast service architecture may flexibly switch between transmitting content to UEs via a DRB (or a unicast bearer) and an MRB, and may provide unicast assistance to the MRB at lower layers to improve reliability and/or reduce service disruption.

As indicated above, FIG. 3 is provided as an example. Other examples may differ from what is described with regard to FIG. 3.

Figure 4:
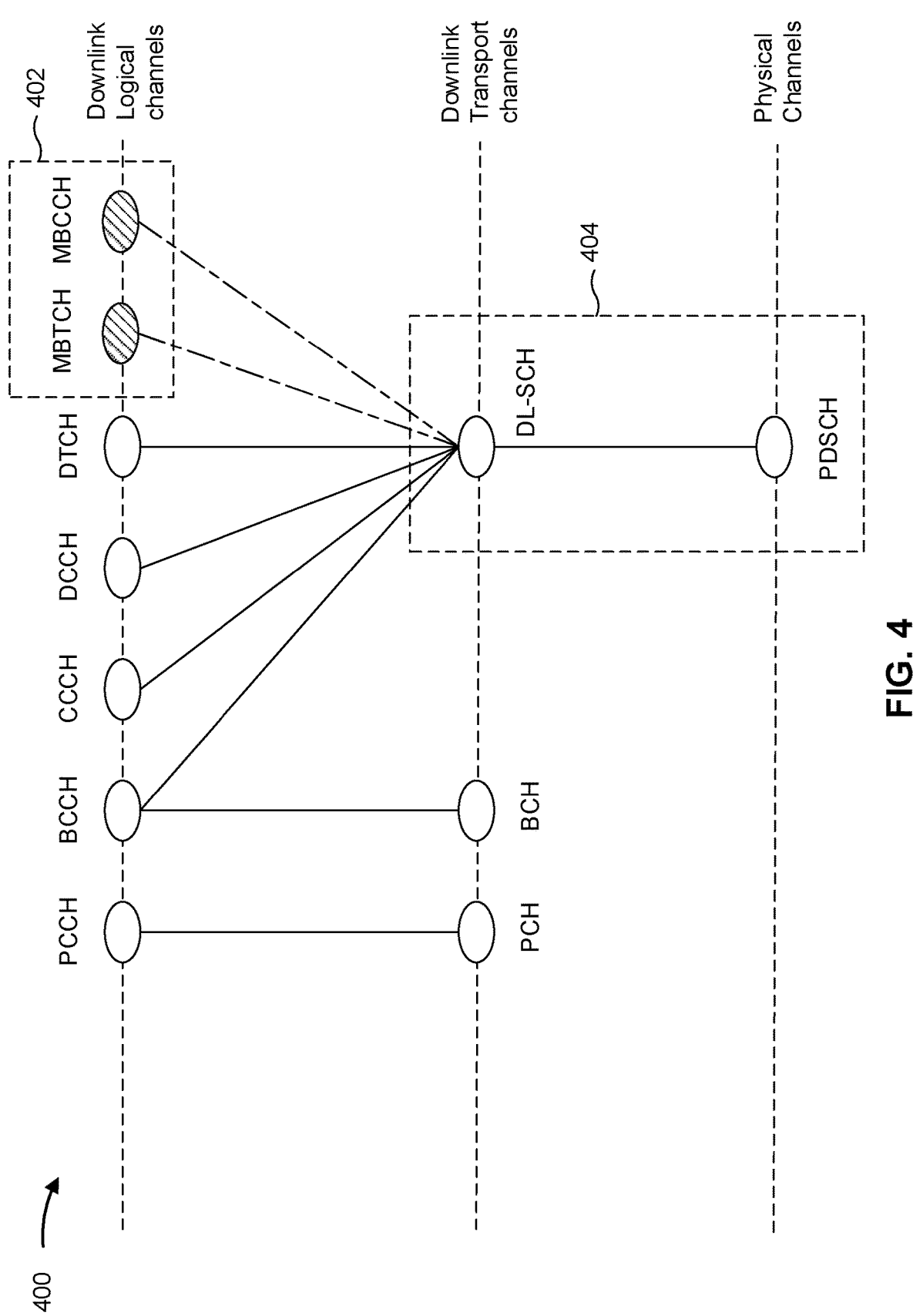
FIG. 4 is a diagram illustrating an example of a channel mapping for multicast broadcast communications, in accordance with the present disclosure.

FIG. 4 is a diagram illustrating an example 400 of a channel mapping for multicast broadcast communications, in accordance with the present disclosure. As shown by reference number 402, multicast or broadcast transmissions in an NR network may be supported using a multicast broadcast traffic channel (MBTCH) and a multicast broadcast control channel (MBCCH). The MBTCH may carry multicast or broadcast data, while the MBCCH may carry configuration information or control information for multicast or broadcast communications to be transmitted on the MBTCH. A multicast or broadcast communication on the MBTCH may be addressed to a group of UEs using a group common radio network temporary identifier (G-RNTI). The MBTCH may be referred to as a multicast traffic channel (MTCH). Similarly, the MBCCH may be referred to as a multicast control channel (MCCH).

In some aspects, different MBTCHs may be used to carry multicast broadcast traffic with different quality of service (QOS) requirements. A multicast broadcast traffic flow with associated QoS requirements or QoS parameters (e.g., a group of related packets for the same multicast broadcast service) may be referred to as an MB-QoS flow. In some aspects, there may be a one-to-one mapping between MB-QoS flows and MBTCHs. A base station or a core network device may configure a multicast broadcast radio bearer (MRB) for an MB-QoS flow. In some aspects, there may be a one-to-one mapping between MB-QoS flows and MRBs. Accordingly, each MBTCH may correspond to an MRB for carrying an MB-QoS flow.

The MBCCH may carry configuration information for configuring the MBTCHs, and may be addressed to all UEs in a cell (e.g., a physical cell or a virtual cell) using a single cell RNTI (SC-RNTI). In some aspects, there may be a single MBCCH per cell (physical cell or virtual cell), and the MBCCH may carry MBTCH configuration information for multiple multicast broadcast services with different MB-QoS flows. As shown by reference number 404, the MBCCH and the MBTCH are logical channels, and may be mapped to a downlink shared channel (DL-SCH) transport channel, which may be mapped to a physical downlink shared channel (PDSCH).

A logical channel is defined by the type of data or information the logical channel carries. Logical channels may be referred to as a control channels (e.g., used for transmission of control or configuration) or as a traffic channel (e.g., used for transmission of user data). As shown in FIG. 4, additional examples of logical channels (e.g., in addition to the MBCCH and the MBTCH) include a broadcast control channel (BCCH), a paging control channel (PCCH), a common control channel (CCCH), a dedicated control channel (DCCH), and/or a dedicated traffic channel (DTCH), among other examples.

As indicated above, FIG. 4 is provided as an example. Other examples may differ from what is described with regard to FIG. 4.

Figure 5:
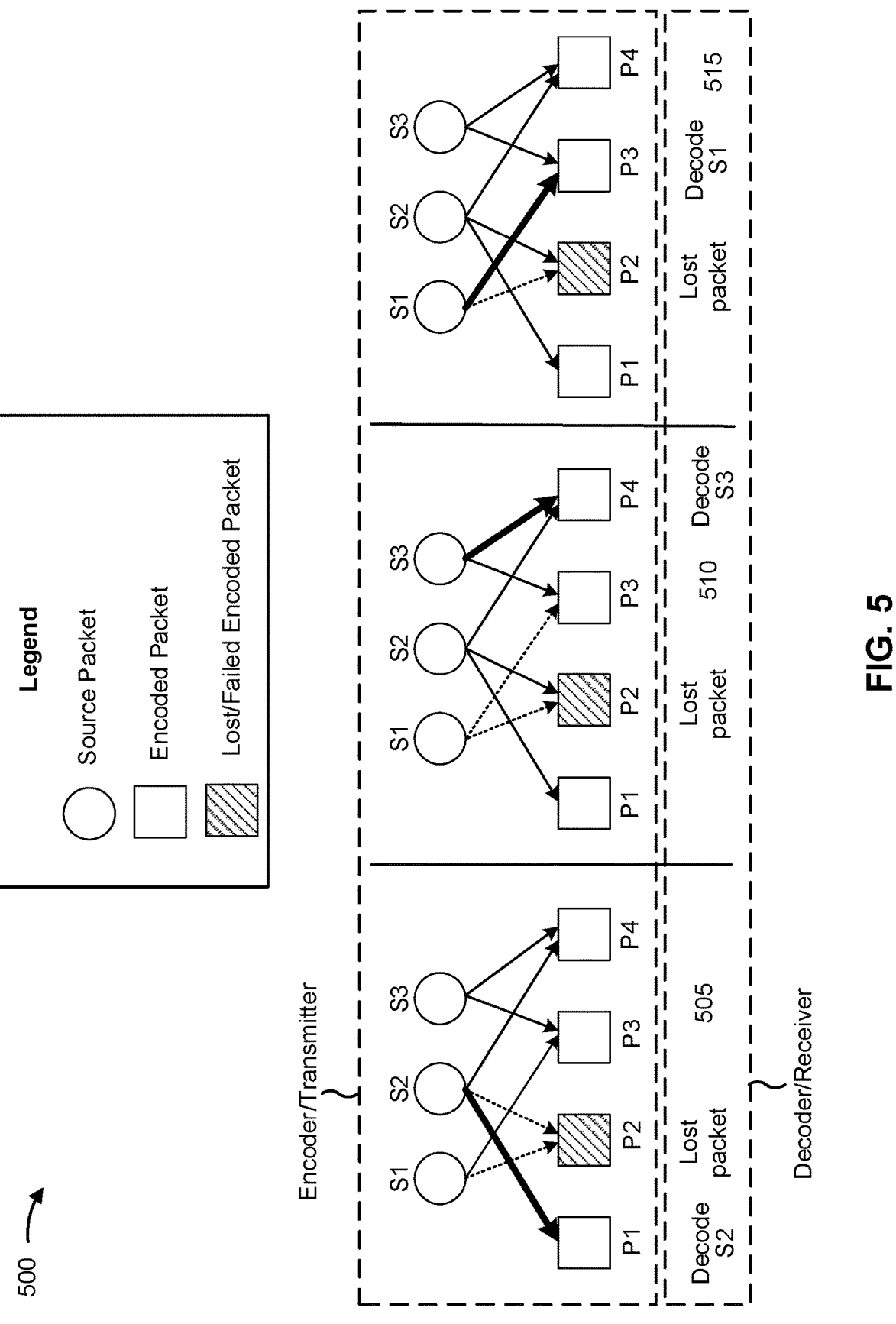
FIG. 5 is a diagram illustrating an example of network coding, in accordance with the present disclosure.

FIG. 5 is a diagram illustrating an example 500 of network coding, in accordance with the present disclosure. As shown in FIG. 5, an encoder (or transmitter) may communicate with a decoder (or receiver). The encoder is sometimes also referred to as a transmitter, an encoder node, or a transmitter node. The encoder may include a UE 120, a base station 110, and/or an integrated access and backhaul (IAB) device, among other examples. An IAB device may include an IAB donor (e.g., a central unit (CU) of an IAB donor and/or a distributed unit (DU) of an IAB donor) or an IAB node (e.g., a DU of an IAB node and/or a mobile termination (MT) of an IAB node). The decoder is sometimes also referred to as a receiver, a decoder node, or a receiver node. The decoder may include a UE 120, a base station 110, and/or an IAB device, among other examples.

As shown in FIG. 5, an encoder (or transmitter) may encode data, shown as a set of source packets or original packets (p1, p2, and p3), into a set of encoded packets using network coding. An encoded packet may be the same as a source packet, may be a redundancy version of a source packet, may include a combination of multiple source packets (e.g., a subset of the source packets), and/or may include a redundancy version of the combination. The number of encoded packets may be the same as or different than the number of source packets. In some aspects, the number of encoded packets may be unlimited (e.g., the encoder may generate any number of encoded packets), such as when using a rateless network coding scheme. In example 500, the encoder encodes K source packets (where K=3) into N encoded packets (where N=4). The encoder transmits the encoded packets to a decoder (or receiver). The decoder uses network coding to decode the encoded packets and recover the source packets. As used herein, network coding may be performed using any type of network coding scheme, such as fountain coding, linear network coding, random linear network coding, Luby transform (LT) network coding, and/or Raptor network coding, among other examples.

In example 500, the encoder encodes three source packets (S1, S2, and S3) into four encoded packets: P1 (e.g., that carries S2), P2 (e.g., that carries S1+S2), P3 (e.g., that carries S1+S3), and P4 (e.g., that carries S2+S3). The encoder may transmit the four encoded packets to the decoder. In this example, the packet P2 (carrying S1+S2) is not successfully received by the decoder. In a first operation 505, the decoder decodes the packet P1 (carrying S2). In a second operation 510, the decoder obtains S3 from the packet P4 (carrying S2+S3) because the decoder has already decoded S2 and can use combining to obtain S3 from S2+S3. In a third operation 515, the decoder obtains S1 from the packet P3 (carrying S1+S3) because the decoder has already decoded S3 and can use combining to obtain S1 from S1+S3. In some aspects, an encoded packet may include an indication (e.g., in a header of the encoded packet) that indicates the source packet(s) that are included in the encoded packet. Thus, the decoder can obtain S1, S2, and S3 despite P2 failing, and using less overhead than packet data convergence protocol (PDCP) duplication. For example, PDCP duplication may duplicate all of the source packets for a total of six transmissions, while the example network coding shown in FIG. 5 uses four transmissions.

In some cases, the encoder may continue to transmit encoded packets (e.g., the same combination of encoded packets or different combinations of encoded packets) to the decoder until the encoder receives a notification from the decoder. For example, the decoder may successfully receive the source packets or may abort decoding, which may trigger the decoder to send a notification to the encoder. The notification may include, for example, an acknowledgement (ACK) and/or a stop message (STOP). In some cases, the decoder may transmit an ACK for each original packet that is successfully received. Additionally, or alternatively, the decoder may transmit an ACK upon successful reception of all of the source packets. Upon receiving the notification, the encoder may encode additional data (e.g., a new set of source packets, such as S4, S5, and S6), and may transmit encoded packets to the decoder, in a similar manner as described above, until all of the data has been transmitted and/or successfully received. Alternatively, to conserve network resources and reduce overhead, the encoder may not transmit an ACK or a negative acknowledgement (NACK) for received packets.

In some cases, such as when using a Raptor network coding scheme, the encoder may perform inner coding, or precoding, to generate a set of intermediate packets, that include a set of redundant packets, from the source packets. A redundant packet may be a copy of a source packet or a redundancy version of a source packet. In some aspects, a redundant packet may be a low density parity check (LDPC) packet. For example, the encoder may apply inner coding to generate K' intermediate packets (e.g., original plus redundant packets from K source packets). The encoder may then perform outer coding (e.g., fountain coding and/or LT network coding) to generate N encoded packets from the K' intermediate packets, in a similar manner as described above. As a result, the encoding and/or decoding complexity of the Raptor network coding scheme may be linear. The encoded packets may include a set of systematic packets and a set of repair packets. In some aspects, the decoder may choose to not decode a packet included in the set of systematic symbols that has a high decoding complexity (e.g., is associated with a high encoding degree and/or is associated with a high number of source packets). The decoder may recover the source packets associated with the packet that is not decoded from one or more packets included in the set of repair packets. The one or more packets included in the set of repair packets may be associated with a lower decoding complexity. As a result, the decoding complexity may be reduced.

As indicated above, FIG. 5 is provided as an example of network coding. Other examples of network coding may differ from what is described with regard to FIG. 5.

Figure 6:
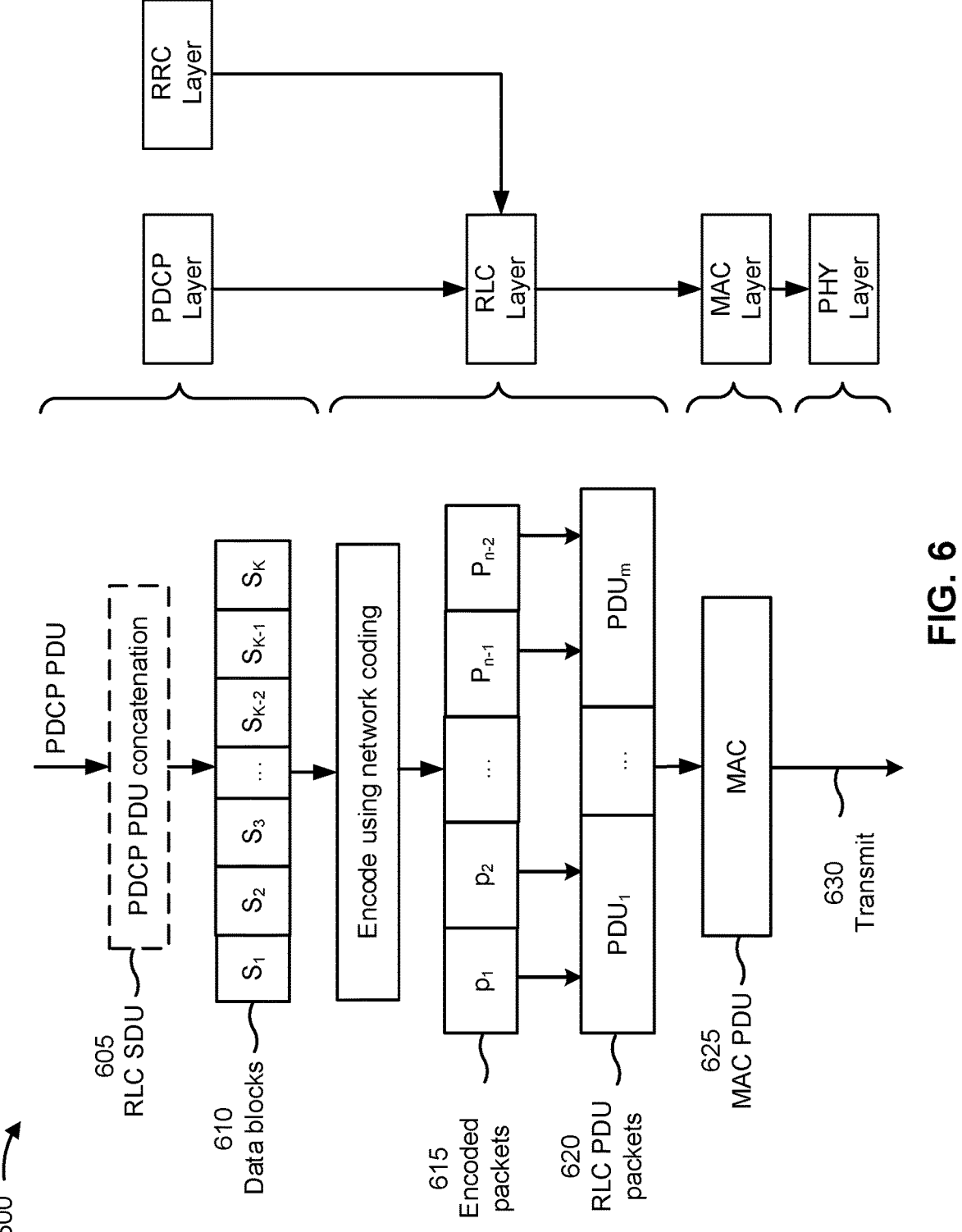
FIG. 6 is a diagram illustrating an example of network coding, in accordance with the present disclosure.

FIG. 6 is a diagram illustrating an example 600 of network coding, in accordance with the present disclosure. The operations described in connection with FIG. 6 may be performed by a transmitter (also referred to as an encoder), such as a UE 120 or a base station 110.

As shown by reference number 605, a transmitter may generate an RLC service data unit (SDU) from one or more packet data convergence protocol (PDCP) protocol data units (PDUs). In some aspects, a single PDCP PDU is included in an RLC SDU. In some aspects, multiple PDCP PDUs are included in an RLC SDU (e.g., by concatenating multiple PDCP PDUs). In some aspects, the transmitter determines whether to include a single PDCP PDU in a single RLC SDU or whether to concatenate multiple PDCP PDUs in a single RLC SDU based at least in part on a size of the PDCP PDU. For example, if the size of the PDCP PDU satisfies a threshold (e.g., is greater than or equal to the threshold), then the encoder may include only the PDCP PDU (e.g., a single PDCP PDU) in a single RLC SDU. If the size of the PDCP PDU does not satisfy a threshold (e.g., is less than or equal to the threshold), then the encoder may concatenate multiple PDCP PDUs (e.g., a set of PDCP PDUs with a total size that is less than or equal to the threshold) into a single RLC SDU.

As shown by reference number 610, the transmitter may divide the RLC SDU into a plurality of data blocks. For example, the transmitter may divide the RLC SDU into K data blocks, shown as s1 through sK, based at least in part on the set of network coding parameters. In some aspects, the set of network coding parameters specify the value of K for a particular set of sub-parameters, such as a payload size for the RLC SDU and/or a size of a sequence number field in an RLC PDU header for the RLC SDU. In some aspects, the encoder determines the value of K for a set of sub-parameters.

In some aspects, the operations associated with reference number 605 and 610 may be performed at the PDCP layer of the transmitter. The PDCP layer may provide the data blocks to the RLC layer of the transmitter. As shown by reference number 615, the transmitter may encode the K data blocks into N encoded packets (sometimes referred to as forward error correcting (FEC) packets) using network coding. For example, the transmitter may encode the K data blocks into the N encoded packets, shown as p1 through pN, based at least in part on a rateless code, such as a network code, a fountain code, an LT code, and/or a Raptor code, among other examples (e.g., in a similar manner as described in connection with FIG. 4). In particular, the transmitter may encode the K data blocks into the N encoded packets such that the N encoded packets include additional information or bits for purposes of forward error correction. This permits encoded packets to be recovered by a receiver, for example, if the number of received encoded packets is larger than the number of K data blocks regardless of which encoded packets are received.

In some aspects, the number of RLC packets (e.g., the value of N) is based at least in part on the set of network coding parameters. In some aspects, the set of network coding parameters specifies the value of N for a particular set of sub-parameters, a delay budget for the RLC SDU, available encoding and decoding computation resources of the transmitter, the value of K (e.g., the number of data blocks), a target error probability for one or more RLC PDU packets for the N encoded packets, channel conditions for transmission of the RLC PDU packets(s), and/or the type of network code that is to be used to encode the K data blocks into the N encoded packets, among other examples. In some examples, the transmitter may determine the value of N for a set of sub-parameters.

As shown by reference number 620, the transmitter may map the N encoded packets to a corresponding M RLC PDU packets. For example, the transmitter may map N encoded packets to M RLC PDU packets, shown as PDU1 through PDU M, such that some RLC PDUs include a plurality of encoded packets (e.g., two encoded packets in an RLC PDU packet, four encoded packets in an RLC PDU packet, or another number of encoded packets in an RLC PDU packet). In some examples, the operations associated with reference number 615 and 620 are performed at the RLC layer of the transmitter. The RLC layer may receive an indication of the set of network coding parameters from the RRC layer and may perform the operations associated with reference number 615 and 620 based at least in part on the set of network coding parameters.

The RLC layer may provide the M RLC PDU packets to a medium access control (MAC) layer of the transmitter. As shown by reference number 625, the transmitter may generate a MAC PDU for the M RLC PDU packets. In some aspects, the MAC PDU includes an RLC PDU header or a MAC PDU header, which may include information associated with each of the M RLC PDUs. For example, the RLC PDU header or MAC PDU header may include a sequence number field, which may indicate a sequence number associated with each of the M RLC PDUs. In some aspects, the operations associated with reference number 625 are performed at the MAC layer of the transmitter.

The MAC layer of the transmitter may provide the MAC PDU to the physical (PHY) layer of the transmitter. As shown by reference number 630, the encoder may transmit the M RLC PDU packets (e.g., in the MAC PDU) to a receiver (also referred to as a decoder), such as a UE 120 or a base station 110. In some aspects, the PHY layer of the transmitter may transmit the M RLC PDU packets (e.g., in the MAC PDU) over a wireless physical channel, such as a PDSCH, a physical downlink control channel (PDCCH), a physical uplink shared channel (PUSCH), a physical uplink control channel (PUCCH), a physical sidelink control channel (PSCCH), and/or a physical sidelink shared channel (PSSCH), among other examples.

As indicated above, FIG. 6 is provided as an example. Other examples may differ from what is described with respect to FIG. 6.

In some cases, wireless networks may support broadcast communication, in which a communication is provided to all UEs of a cell, or multicast communication, in which a communication is provided to a group of UEs. Multicast/broadcast services (MBS) may be useful for broad dissemination of information, such as emergency alerts, audio content, or video content, among other examples. Support for MBS is being added to NR. In NR, a UE may be capable of receiving, for example, MBS in a mixed mode or a broadcast mode. Using mixed mode, MBS may be delivered using either an MRB or a DRB for a UE in a radio resource control (RRC) connected state. Using broadcast mode, MBS may be delivered using an MRB for a UE in an RRC connected state, an RRC idle state, or an RRC inactive state.

However, in some cases, MBS may experience reduced reliability. For example, because MBS may be associated with a broad dissemination of information, a transmitter (e.g., a base station or a UE) that is transmitting an MBS message may not use a beam or a given spatial direction that is associated with a given receiver (e.g., a UE or another wireless communication device). Rather, the transmitter may transmit the MBS message over a range of spatial directions and/or beams (or use a beam that is associated with a broad range of spatial directions, rather than a beam that is narrowed to a given spatial direction) to ensure that multiple receivers associated with the MBS are enabled to receive the MBS message. Therefore, in some cases, a receiver may be unable to successfully receive the MBS message. In a unicast scenario, the receiver may be able to correct errors associated with failing to receive a message by requesting a retransmission of the message (e.g., by transmitting feedback indicating a NACK of the message as part of an RLC acknowledged mode (RLC-AM). However, in an MBS scenario, retransmissions may not be supported. Additionally, or alternatively, the MBS may not support the RLC-AM. Therefore, receivers may be unable to correct errors associated with receiving MBS transmissions. This reduces communication performance and/or efficiency associated with the MBS because the receiver may be unable to receive the MBS message and/or may need to wait for the MBS message to be fully transmitted again (e.g., in order to receive the MBS message).

Some techniques and apparatuses described herein enable network coding in an RLC layer for multicast/broadcast transmissions. For example, networking coding may be used for MBS initial transmissions and/or for MBS retransmissions. For example, the MBS may use retransmissions to improve the reliability and efficiency of MBS transmission. "Initial transmission" may refer to an original transmission of a message (e.g., an MBS message). "Retransmission" may refer to an additional transmission of an initial transmission due to a reception failure associated with the initial communication (e.g., due to a reception of a NACK by the transmitter). In some cases, a retransmission may be the same as the initial transmission (e.g., may carry the same information as the initial transmission) associated with the retransmission. In some other cases, a retransmission may be different than the initial transmission (e.g., may carry information that is at least partially different than the information carried by the initial transmission). For example, a retransmission may only carry information associated with the initial transmission that was not successfully received and/or recovered by a receiver.

In some aspects, a receiver may be scheduled (e.g., by an RLC entity) to use a multicast traffic channel (e.g., a multicast/broadcast traffic channel and/or the MBTCH) for MBS transmissions when a value of a measurement parameter (e.g., RSRP and/or RSRQ, among other examples) satisfies a threshold. The receiver may be scheduled (e.g., by the RLC entity) to use a dedicated traffic channel (e.g., the DTCH) for MBS transmissions when a value of the measurement parameter does not satisfy the threshold. As described elsewhere herein, the dedicated traffic channel may use a beam or spatial direction that is associated with the UE (e.g., that is selected as part of a beam management procedure). As a result, using the dedicated traffic channel for MBS transmissions when the value of the measurement parameter for the receiver does not satisfy the threshold may improve efficiency and reliability of the MBS transmissions. In some aspects, an initial transmission of an MBS message may be transmitted via the multicast traffic channel (e.g., to enable broad dissemination of the MBS message). In some aspects, a retransmission of the MBS message may be transmitted via the dedicated traffic channel (e.g., to improve the efficiency and reliability of the retransmission). In some other aspects, the retransmission of the MBS message may be transmitted via the multicast traffic channel.

Additionally, or alternatively, the MBS transmissions and MBS retransmissions may use network coding to improve the reliability and efficiency associated with the MBS. For example, network coding may be used in upper layers, such as the RLC layer, by transmitters and receivers associated with the MBS to improve the reliability and efficiency associated with the MBS. In some aspects, both multicast traffic channels and the dedicated traffic channels may be used for MBS transmissions (and retransmissions), where the MBS transmissions (and retransmissions) use network coding.

For example, a transmitter may transmit (e.g., via the multicast traffic channel or the dedicated traffic channel) an initial MBS transmission using network coding. A receiver may receive the initial MBS transmission and attempt to decode the encoded packets included in the initial MBS transmission. In some aspects, the receiver may transmit, to the transmitter, a feedback message indicating packets (e.g., RLC SDUs, encoded packets, and/or RLC PDUs) that were not successfully received by the receiver. In some aspects, the feedback message may indicate a number of encoded packets needed for the receiver to successfully decode an RLC SDU. The feedback message may be an RLC status PDU. The transmitter may receive the feedback message and generate a retransmission of the initial MBS transmission based on information included in the feedback message. The transmitter may transmit (e.g., via the multicast traffic channel or the dedicated traffic channel) the retransmission. As a result, an efficiency and reliability of the MBS may be improved.

FIGS. 7A-7F are diagrams illustrating an example 700 associated with network coding in an RLC layer for multicast/broadcast transmissions, in accordance with the present disclosure. As shown in FIGS. 7A-7F, a base station 110 and a UE 120 may communicate with one another in a wireless network, such as the wireless network 100. In the example 700, the base station 110 may be a transmitter and/or an encoder. In the example 700, the UE 120 may be a receiver and/or a decoder. While example 700 depicts the base station 110 as the transmitter and the UE 120 as the receiver, other wireless communication devices may perform similar functions as a transmitter and/or receiver as described herein (e.g., a UE 120 or another wireless communication device may be a transmitter and may perform similar functions as described herein in connection with the base station 110).

In some aspects, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or MAC signaling (e.g., MAC control elements (MAC-CEs)). In some aspects, the configuration information may include an indication of one or more configuration parameters (e.g., already known to the UE 120) for selection by the UE 120 and/or explicit configuration information for the UE 120 to use to configure the UE 120.

In some aspects, the configuration information may indicate that network coding is enabled for initial transmissions associated with an MBS and indicate that network coding is enabled for retransmissions associated with the MBS. For example, the configuration information may include a first indication (e.g., a first flag and/or a first RRC parameter) that indicates that network coding is enabled for initial transmissions associated with the MBS. Additionally, the configuration information may include a second indication (e.g., a second flag and/or a second RRC parameter) that indicates that network coding is enabled for retransmissions associated with the MBS.

In some aspects, the configuration information may indicate that retransmissions are enabled for the MBS. In some aspects, the configuration information may indicate that an RLC-AM is enabled for the MBS. In some aspects, the configuration information may indicate that MBS transmissions and MBS retransmissions may be transmitted via a multicast traffic channel (e.g., the MBTCH) and/or via a dedicated traffic channel (e.g., the DTCH). For example, the configuration information may indicate that, based at least in part on a signal strength or signal quality experienced by the UE 120, MBS transmissions and/or retransmissions may be scheduled to use the multicast traffic channel or the dedicated traffic channel.

For example, the configuration information may indicate one or more thresholds associated with MBS channel selection between the multicast traffic channel or the dedicated traffic channel. The one or more thresholds may include one or more RSRP thresholds, and/or one or more RSRQ thresholds, among other examples. The one or more RSRP thresholds may include a synchronization signal (SS) RSRP threshold (e.g., an RSRP measured using an SS, such as a SS block (SSB)) and/or a channel state information (CSI) RSRP threshold (e.g., an RSRP measured using a CSI reference signal (CSI-RS)), among other examples. The one or more RSRQ thresholds may include an SS RSRQ threshold and/or a CSI RSRQ threshold, among other examples. In some aspects, the configuration information may indicate that the one or more RSRP thresholds, and/or the one or more RSRQ thresholds are associated with measurements performed using a physical multicast channel (PMCH). In some aspects, the one or more thresholds may include a threshold associated with a number of received encoded packets (e.g., that are needed by the UE 120 to successfully decode an MBS transmission). In some aspects, the threshold associated with the number of received encoded packets may be for each RLC SDU transmitted in the MBS transmission (e.g., the threshold may indicate a value of the number of received encoded packets divided by K, where K is the number of source packets associated with each RLC SDU).

In some aspects, the configuration information may indicate a periodic schedule associated with providing measurement reports from a MAC entity to an RLC entity. For example, the configuration information may indicate a periodic timer that indicates a timing for the MAC entity to report measurement values (e.g., RSRP measurement values and/or RSRQ measurement values) to the RLC entity. For example, as described in more detail elsewhere herein, the measurement values may be used for MBS channel selection between the multicast traffic channel or the dedicated traffic channel for a given UE 120. The configuration information may indicate a periodicity or a periodic schedule associated with the MAC entity reporting the measurement values to the RLC entity to enable the RLC entity to make the MBS channel selection between the multicast traffic channel or the dedicated traffic channel. In some aspects, the configuration information may indicate that the UE 120 is to transmit, to the base station 110, measurement reports indicating the one or more measurement values (e.g., in accordance with the periodic schedule). The measurement reports may be periodic measurement reports (e.g., transmitted in accordance with a periodic schedule) or may be aperiodic measurement reports (e.g., transmitted based at least in part on a trigger event and/or a request from the base station 110).

In some aspects, the configuration information may indicate a threshold associated with a number of UEs that indicate a need for a retransmission of an MBS transmission. For example, in some aspects, the base station 110 may make an MBS channel selection between the multicast traffic channel or the dedicated traffic channel based at least in part on a number of UEs that indicate (e.g., via a feedback message, such as via transmitting a NACK associated with the MBS transmission) a need for a retransmission of the MBS transmission. As described in more detail elsewhere herein, the base station 110 may transmit the retransmission via the multicast traffic channel if the number of UEs that indicate a need for the retransmission is greater than or equal to the threshold. The base station 110 may transmit the retransmission via the dedicated traffic channel(s) if the number of UEs that indicate a need for the retransmission is less than the threshold.

In some aspects, the configuration information may indicate content to be included in feedback messages transmitted by the UE 120 associated with the MBS. For example, in some aspects, the configuration may indicate that feedback messages associated with the MBS are to include an ACK sequence number (e.g., indicating that SDU sequence numbers, associated with an initial transmission of an MBS transmission, less than the ACK sequence number were successfully received by the UE 120). In some aspects, the configuration may indicate that feedback messages associated with the MBS are to include a first NACK sequence number (e.g., indicating an RLC SDU, associated with the initial transmission, that was not successfully received by the UE 120). In some aspects, the configuration may indicate that feedback messages associated with the MBS are to include the first NACK sequence number and an indication of a number of additional encoded packets needed to successfully decode the RLC SDU indicated by the NACK sequence number. In some aspects, the configuration may indicate that feedback messages associated with the MBS are to include the first NACK sequence number and an indication of a number of encoded packets from a set of encoded packets associated with the initial MBS transmission, associated with the RLC SDU indicated by the NACK sequence number, that were successfully received by the UE 120.

In some aspects, the configuration may indicate that feedback messages associated with the MBS are to include the first NACK sequence number and a second NACK sequence number (e.g., the second NACK sequence number indicating an encoded packet, associated with the RLC SDU, that was not successfully received by the UE 120). In some aspects, the configuration may indicate that feedback messages associated with the MBS are to include the first NACK sequence number, the second NACK sequence number, and a NACK segmentation index (e.g., the NACK segmentation index indicating an RLC PDU, associated with the RLC SDU and the encoded packet, that was not successfully received by the UE 120). In some aspects, the configuration may indicate that feedback messages associated with the MBS may include a rate adjustment command associated with adjusting a number of RLC PDUs associated with a single RLC SDU.

In some aspects, the UE 120 may configure the UE 120 for communicating with the base station. In some aspects, the UE 120 may configure the UE 120 based at least in part on the configuration information. In some aspects, the UE 120 may be configured to perform one or more operations described herein.

As shown by reference number 705, the base station 110 may transmit, and the UE 120 may receive, an initial transmission associated with the MBS. The initial transmission may include a first set of encoded packets. For example, the base station 110 may perform network coding (e.g., fountain coding, linear network coding, random linear network coding, LT network coding, and/or Raptor network coding) to generate the first set of encoded packets (e.g., from one or more RLC SDUs associated with the initial transmission). The generation and transmission of the initial transmission associated with the MBS is depicted and described in more detail in connection with FIG. 7B.

As shown by reference number 710, the UE 120 may receive the initial transmission and may attempt to decode the initial transmission. For example, the UE 120 may identify packets from the first set of encoded packets that were successfully received by the UE 120. The UE 120 may identify RLC SDUs, encoded packets, and/or RLC PDUs that were not successfully received by the UE 120 (e.g., based at least in part on information included in headers of the successfully received encoded packets). The UE 120 may attempt to decode the encoded packets to obtain a set of source packets (e.g., associated with an RLC SDU). The UE 120 may attempt to reassemble the RLC SDU from the decoded source packets. The reception and decoding of the initial transmission by the UE 120 MBS are depicted and described in more detail in connection with FIG. 7C.

As shown by reference number 715, the UE 120 may transmit, and the base station 110 may receive, a feedback message associated with the MBS. For example, the UE 120 may transmit, and the base station 110 may receive, an RLC status feedback message associated with the initial transmission associated with the MBS. The RLC status feedback message may be an RLC status PDU. The RLC status feedback message may indicate one or more RLC SDUs, one or more encoded packets (from the first set of encoded packets), and/or one or more RLC PDUs, associated with the initial transmission, that were not successfully received by the UE 120. In some aspects, the RLC status feedback message may indicate a number of additional encoded packets needed to successfully decode one or more RLC SDUs associated with the initial transmission. In some aspects, the RLC status feedback message may indicate a number of encoded packets from the first set of encoded packets, associated with an RLC SDU that was not successfully decoded by the UE 120, that were successfully received by the UE 120. In some aspects, the RLC status feedback message may indicate a rate adjustment command.

As shown by reference number 720, the base station 110 may transmit, and the UE 120 may receive, a retransmission associated with the initial transmission. The transmission may include a second set of encoded packets. For example, the base station 110 may perform network coding (e.g., fountain coding, linear network coding, random linear network coding, LT network coding, and/or Raptor network coding) to generate the second set of encoded packets. In some aspects, source packets (or systematic packets) used to generate the second set of encoded packets may be based at least in part on information included in the RLC status feedback message. The generation and transmission of the retransmission associated with the MBS is depicted and described in more detail in connection with FIGS. 7D, 7E, and 7F.

FIG. 7A depicts an overview of a Layer 2 structure associated with the MBS transmission, retransmission, and network coding scheme described herein. As shown in FIG. 7A, a service data adaptation protocol (SDAP) entity configured on the base station 110 (and/or the UE 120) may handle QoS flows. For example, the SDAP entity may, for a given QoS flow, decide how to map the QoS flow to radio bearers (e.g., DRBs and/or MRBs). A packet data convergence protocol (PDCP) entity configured on the base station 110 (and/or the UE 120) may perform robust header compression (ROHC) and/or apply one or more security protocols. The PDCP entity may map a radio bearer to an RLC channel.

An RLC entity configured on the base station 110 (and/or the UE 120) may perform networking coding for an MBS transmission or MBS retransmission, as described in more detail elsewhere herein. As shown in FIG. 7A, the RLC entity may be configured with one or more logical channels (e.g., in a similar manner as described in connection with FIG. 4). For example, the RLC entity may be configured with a multicast traffic channel (shown as the MBTCH) and a dedicated traffic channel (shown as the DTCH). The RLC entity may map an MBS transmission and/or MBS retransmission to either the multicast traffic channel or the dedicated traffic channel.

The base station 110 and/or the RLC entity may map the MBS transmission and/or the MBS retransmission to the multicast traffic channel or the dedicated traffic channel based at least in part on one or more measurement values reported by the UE 120. For example, the UE 120 may transmit, and the base station 110 may receive, a measurement report indicating one or more measurement values. A MAC entity may provide the one or more measurement values to the RLC entity. The base station 110 and/or the RLC entity may select on MBS channel for the initial transmission based at least in part on the one or more measurement values.

For example, for the initial transmission (shown by reference number 705), the base station 110 and/or the RLC entity may map the initial transmission to the multicast traffic channel if the one or more measurement values satisfy a first threshold (e.g., an SS-RSRP threshold, an SS-RSRQ threshold, a CSI-RSRP threshold, and/or a CSI-RSRQ threshold). The base station 110 and/or the RLC entity may map the initial transmission to the dedicated traffic channel if the one or more measurement values do not satisfy the first threshold. As described elsewhere herein, the dedicated traffic channel may enable the base station 110 to use a specific beam that is associated with the UE 120 to transmit the initial transmission. Therefore, a performance and/or reliability of the initial transmission may be improved because the beam may be selected as part of a beam management procedure, thereby ensuring that the beam is associated with improved channel qualities.

Similarly, for the retransmission (shown by reference number 720), the base station 110 and/or the RLC entity may map the retransmission to the multicast traffic channel if the one or more measurement values satisfy the first threshold. The base station 110 and/or the RLC entity may map the retransmission to the dedicated traffic channel if the one or more measurement values do not satisfy the first threshold. In some aspects, the initial transmission may be mapped to the multicast traffic channel. The retransmission may be mapped to the dedicated traffic channel (e.g., based at least in part on the initial transmission being mapped to the multicast traffic channel). For example, for the MBS, all initial transmission may be transmitted via the multicast traffic channel and all retransmissions may be transmitted via the dedicated traffic channel. In some aspects, for the MBS, all initial transmission may be transmitted via the multicast traffic channel and retransmissions may be transmitted via the dedicated traffic channel or the multicast traffic channel (e.g., depending on the measurement values reported by the UE 120).

Transmitted MBS messages via a dedicated traffic channel may improve the reliability and efficiency associated with the MBS. For example, the dedicated traffic channel may be associated with a dedicated beam for a UE 120 (e.g., as described elsewhere herein). Therefore, a packet loss rate associated with the dedicated traffic channel may be less than a packet loss rate of the multicast traffic channel (e.g., when the UE 120 is associated with a poor RSRP or a poor RSRQ for the multicast traffic channel). Therefore, if the base station 110 transmits packets (e.g., encoded packets) via the dedicated traffic channel, the UE 120 may be enabled to successfully receive and/or decode more of the packets than if the packets were transmitted via the multicast traffic channel. Therefore, the base station 110 may perform MBS channel selection to improve the reliability and/or efficiency of MBS transmissions and MBS retransmissions. For example, using the multicast traffic channel may enable improved efficiency and/or enable broad dissemination for the MBS transmissions and MBS retransmissions (e.g., because the base station 110 may be enabled to transmit a single message for multiple UEs 120) and using the dedicated traffic channel may improve reliability and efficiency for UEs 120 associated with the MBS that are experiencing poor quality or signal strength associated with the multicast traffic channel.

In some aspects, the base station 110 and/or the RLC entity may map the retransmission to the multicast traffic channel or the dedicated traffic channel based at least in part on a number of UEs that indicate (e.g., via feedback messages) a need for a retransmission. For example, the base station 110 may determine the number of UEs that need a retransmission associated with the MBS (e.g., based at least in part on a number of UEs that transmit a feedback message indicating a NACK of the initial transmission associated with the MBS). If the number of UEs that need a retransmission associated with the MBS is greater than or equal to a second threshold, then the base station 110 and/or the RLC entity may map the retransmission to the multicast traffic channel (e.g., to conserve resources as a high amount of UEs need the retransmission). If the number of UEs that need a retransmission associated with the MBS is less than the second threshold, then the base station 110 and/or the RLC entity may map the retransmission to the dedicated traffic channel (e.g., to improve a performance and/or reliability associated with the retransmission).

As shown in FIG. 7A, after the initial transmission and/or the retransmission is mapped to the logical channel (e.g., the multicast channel or the dedicated traffic channel) the MAC entity (configured on the base station 110) may perform scheduling, multiplexing, and/or hybrid automatic repeat request (HARQ) processing, among other examples. The MAC entity may map the initial transmission and/or the retransmission to a transport channel. The base station 110 may perform physical layer processing (not shown in FIG. 7A) to map the initial transmission and/or the retransmission to a physical channel. Physical layer processing may be referred to as lower layer processing or Layer 1 processing (e.g., and may not be considered Layer 2 processing). The base station 110 may transmit the initial transmission and/or the retransmission using the physical channel.

Figure 7B:
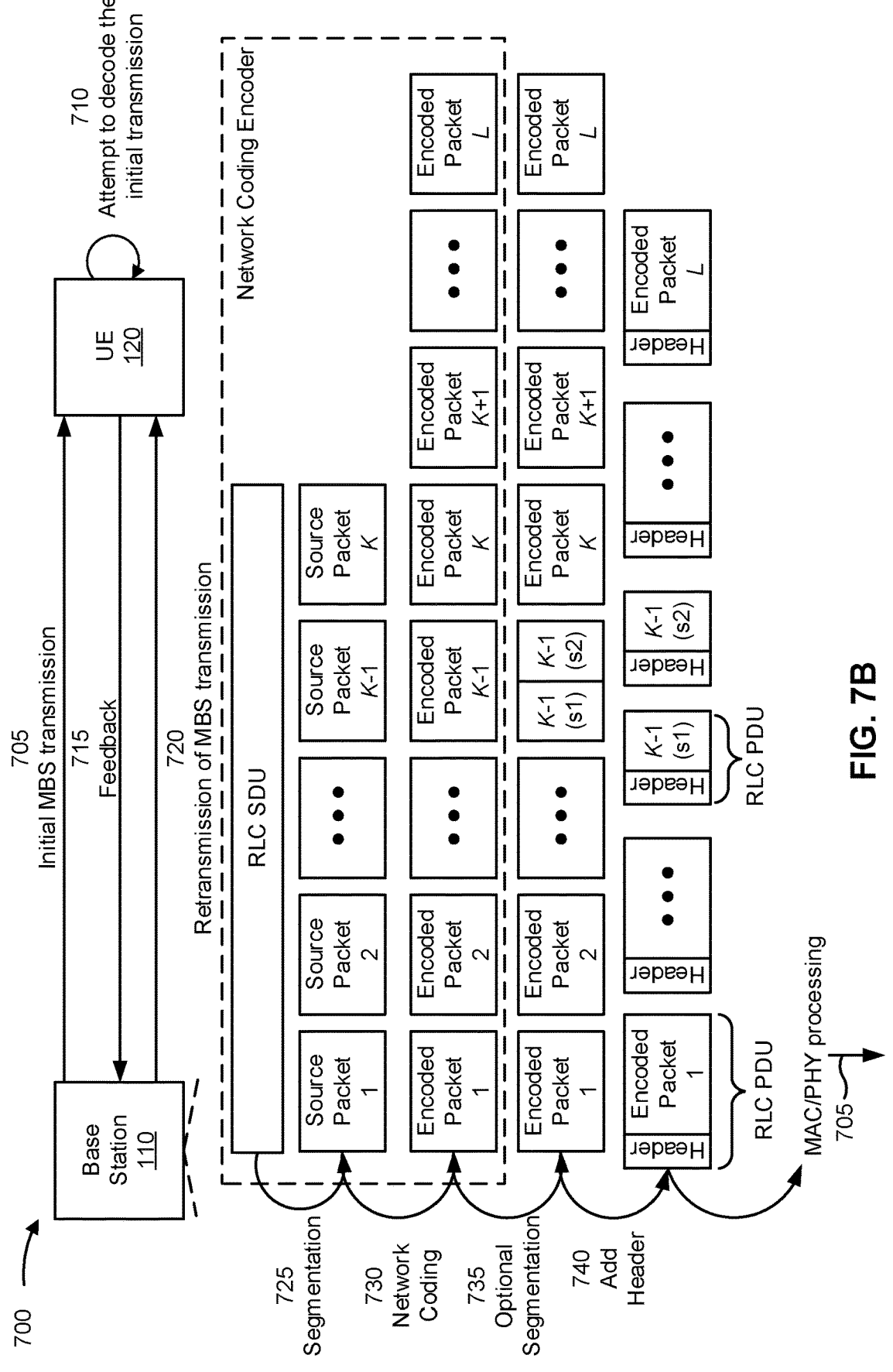

FIG. 7B depicts one or more actions performed by the base station 110 as the transmitter and/or encoder. For example, FIG. 7B depicts one or more actions performed by the base station 110 to generate and/or transmit the initial MBS transmission (shown by reference number 705). For example, the base station 110 may generate multiple RLC PDUs from a single RLC SDU. As shown by reference number 725, the base station 110 (e.g., in an RLC entity) may perform segmentation of the RLC SDU. For example, the base station 110 may segment the single RLC SDU into K packets. The K packets may be K source packets for a network coding procedure.

For example, as shown by reference number 730, the base station 110 may perform network coding to generate L encoded packets from the K source packets (e.g., where L is greater than K). For example, the base station 110 may generate the L encoded packets from the K source packets in a similar manner as described in connection with FIGS. 5 and 6. In some aspects, the base station 110 may encode the source packets using Raptor network coding. In some aspects, the base station 110 may encode the source packets using another type of network coding. As shown in FIG. 7B, a network coding encoder, configured on the base station 110 and/or the RLC entity, may perform the network coding to generate the L encoded packets. The L encoded packets may be the first set of encoded packets that are included in the initial transmission associated with the MBS.

As shown by reference number 735, in some aspects, the base station 110 may perform additional (optional) segmentation to segment one or more of the encoded packets. For example, a number of RLC PDUs to be associated with each RLC SDU may be based at least in part on a grant size indicated by a lower layer, such as a MAC layer (e.g., as defined, or otherwise fixed, by a wireless communication standard, such as a 3GPP Specification). In some aspects, the number of L may be different that the number of RLC PDUs to be associated with each RLC SDU. Therefore, the base station 110 may segment one or more of the encoded packets such that the number of packets (after segmentation) is equal to the number of RLC PDUs to be associated with each RLC SDU. For example, the base station 110 may segment the encoded packet K–1 into a first segment (shown as K–1(s1)) and a second segment (shown is K–1(s2)).

As shown by reference number 740, the base station 110 may add a header (e.g., an RLC header) to each of the encoded packets (after the optional segmentation described in connection with reference number 735) to generate a set of RLC PDUs. The header may include identifiers to identify the single RLC SDU, the encoded packet, and/or the RLC PDU associated with each RLC PDU. For example, for an RLC PDU (e.g., the RLC PDU shown as K–1(s1)), the header may include a first sequence number (SN) indicating the single RLC SDU associated with the RLC PDU (e.g., the RLC SDU shown in FIG. 7B). The header may include a second sequence number indicating an encoded packet, of the first set of encoded packets (e.g., of the L encoded packets), associated with the RLC PDU (e.g., the second sequence number may identify the encoded packet K–1). The second sequence number may be referred to as a sub-SN or an encoded packet SN. The second sequence number may identify an index of the encoded packet (e.g., before the optional segmentation described in connection with reference number 735) associated with the RLC PDU. The header may include a segmentation index identifying a segmentation associated with the RLC PDU (e.g., the segmentation index may identify the segment s1). For example, for the RLC PDU K–1(s2), the header may include the same first sequence number and the same second sequence number as the header of the RLC PDU K–1(s1). However, the header of the RLC PDU K–1(s2) may include a different segmentation index (e.g., s2) than the header of RLC PDU K–1(s1) (e.g., indicating that the RLC PDU K–1(s1) and RLC PDU K–1(s2) are associated with the same RLC SDU and the same encoded packet, but are associated with different segments of the same encoded packet).

As shown in FIG. 7B, after adding the header to the (segmented) encoded packets to generate the set of RLC PDUs, then base station 110 may perform MAC processing and/or PHY processing (e.g., to generate one or more MAC PDUs). After performing the MAC processing and/or PHY processing, the base station 110 may transmit the initial transmission associated with the MBS (e.g., as shown by reference number 705). The base station 110 may process and generate packet(s) for other RLC SDUs associated with the initial transmission in a similar manner as described herein.

Figure 7C:
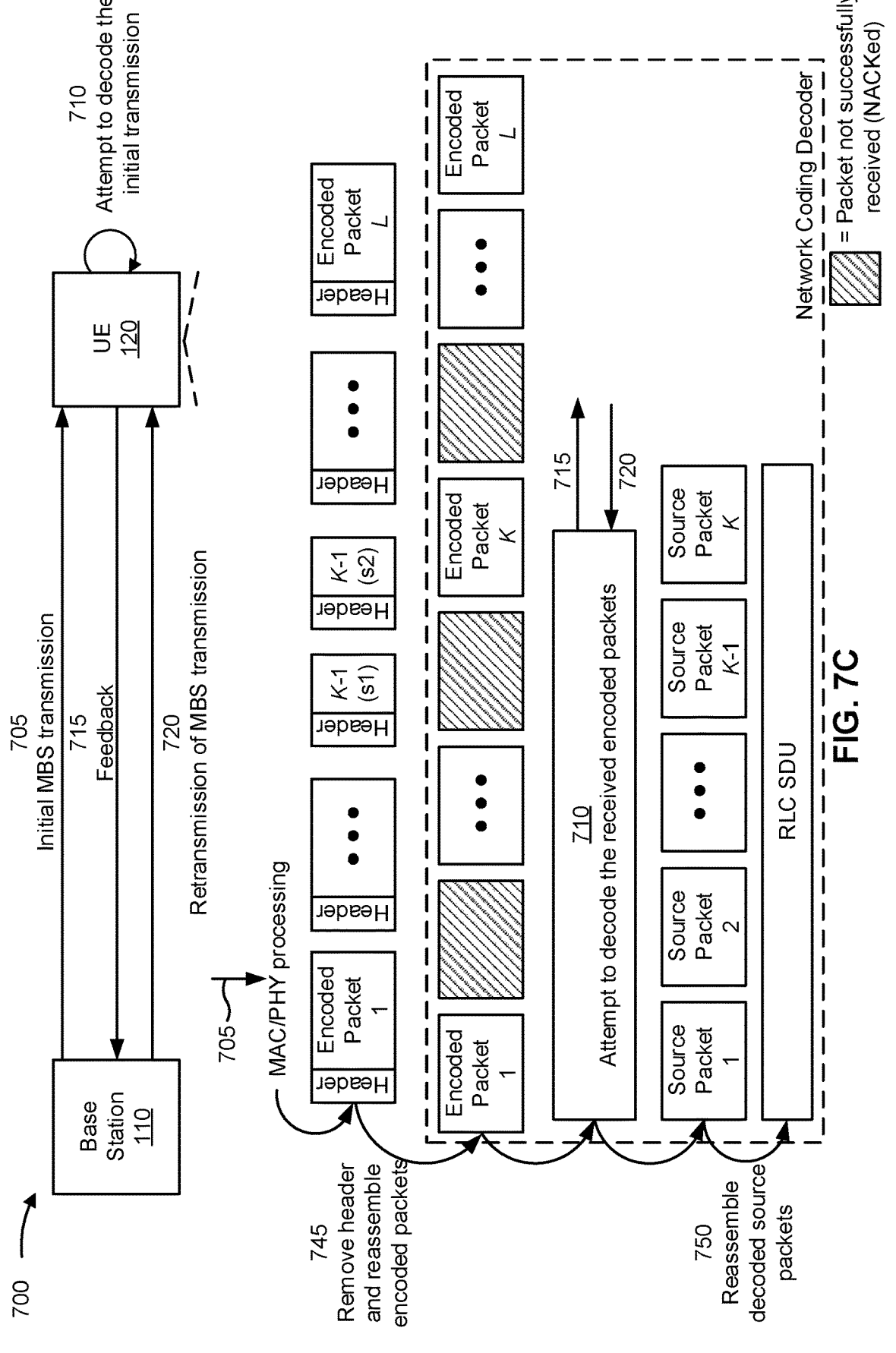

FIG. 7C depicts one or more actions performed by the UE 120 as the receiver and/or decoder. For example, FIG. 7C depicts one or more actions performed by the UE 120 to receive and/or decode the initial MBS transmission (shown by reference number 705) and/or the retransmission of the MBS transmission (shown as reference number 720) to reassemble one or more RLC SDUs associated with the MBS transmission.

The UE 120 may receive the initial transmission associated with the MBS (shown by reference number 705) via a physical channel. The UE 120 may perform PHY processing and/or MAC processing to obtain a set of RLC PDUs associated with the initial transmission. In some aspects, one or more RLC PDUs may be lost in transmission. For example, one or more RLC PDUs (e.g., from the set of RLC PDUs generated by the base station 110 as described above) may not be successfully received by the UE 120. As shown by reference number 745, the UE 120 may remove the header of the received RLC PDUs and reassemble the encoded packets (e.g., if the encoded packets were segmented by the base station 110). As shown in FIG. 7C, the UE 120 may identify one or more encoded packets that were not successfully received. The UE 120 may associate these encoded packets with NACK feedback (e.g., for the feedback message shown by reference number 715). For example, the base station 110 may segment one encoded packet into 2 RLC PDUs (e.g., as described above). If the UE 120 is unable to receive and/or decode any one of the RLC PDUs associated with an encoded packet, then the UE 120 may determine that the encoded packet was not successfully received.

For example, the UE 120 may receive an RLC PDU indicating, in a header of the RLC PDU, a first sequence number (e.g., indicating an RLC SDU), a second sequence number (e.g., indicating an encoded packet), and a segmentation index (e.g., indicating a segment of the encoded packet). The UE 120 may fail to receive another RLC PDU associated with the first sequence number, the second sequence number, and another segmentation index. The UE 120 may determine that the encoded packet associated with the second sequence number is not successfully received by the UE 120 (e.g., based on failing to receive the other RLC PDU). In other words, if the UE 120 is able to successfully receive the RLC PDU K−1(s1) but is not able to successfully receive the RLC PDU K−1(s2), then the UE 120 may determine that the encoded packet K−1 was not successfully received (e.g., is to be associated with NACK feedback).

As shown by reference number 710, the UE 120 may attempt to decode the received encoded packets. As described above, the UE 120 may successfully receive a first subset (e.g., one or more) of encoded packets, from the first set of encoded packets (e.g., the L encoded packets transmitted by the base station 110). The UE 120 may fail to receive a second subset (e.g., one or more) of encoded packets, from the first set of encoded packets. In some aspects, the UE 120 may detect a decoding failure if a number of encoded packets included in the first subset of encoded packets, N, (e.g., the number of encoded packets successfully received by the UE 120) is less than a third threshold. The third threshold may be based at least in part on a number of source packets associated with the first set of encoded packets (e.g., may be based at least in part on a value of K). In some aspects, the third threshold may be K. For example, a decoding failure probability when the number of encoded packets successfully received by the UE 120 is less than the third threshold (e.g., when N<K) may be 1 or 100%. When N≥K, the (theoretical) decoding failure probability may be $0.85 \times 0.567^{N-K}$ (e.g., if Raptor network coding is used) or may be $$\left(\frac{1}{256}\right)^{N-(K+1)}$$

(e.g., if RaptorQ network coding is used).

If the number of encoded packets successfully received by the UE 120 is less than the third threshold (e.g., if a decoding failure is detected), then the UE 120 may trigger the retransmission via the feedback message, as described in more detail elsewhere herein. Otherwise (e.g., if the number of encoded packets successfully received by the UE 120 is greater than or equal to the third threshold), the UE 120 may then continue to attempt to decode the encoded packets to obtain the set of K source packets. For example, the UE 120 may decode the first subset of encoded packets to attempt to obtain a set of source packets associated with the first set of encoded packets (e.g., where a single RLC SDU is obtained from the set of source packets). If the UE 120 detects a decoding failure (e.g., if the UE 120 is unable to successfully decode the encoded packets to obtain the set of K source packets), then the UE 120 may trigger the retransmission via the feedback message, as described in more detail elsewhere herein.

In some aspects, the UE 120 may trigger an early termination of the decoding process. For example, the UE 120 may begin to assemble an RLC SDU, as shown by reference number 750, when the number of encoded packets successfully received by the UE 120 is greater than or equal to a fourth threshold. In some aspects, the fourth threshold may be indicated by the configuration information (e.g., via an RRC configuration). For example, the UE 120 may decode the first subset of encoded packets to obtain a set of source packets associated with the first set of encoded packets. The UE 120 may reassemble the set of source packets to obtain the single RLC SDU based at least in part on a number of encoded packets included in the first subset of encoded packets satisfying the fourth threshold. This may reduce a decoding complexity be enabling the UE 120 to begin to reassemble the RLC SDU once a threshold number of encoded packets is received (e.g., rather than waiting for all encoded packets associated with the initial packet to be received and then performing decoding using all of the received encoded packets associated with the initial transmission).

As another example of an early termination of the decoding process, the UE 120 may stop receiving and/or processing RLC PDUs associated with an RLC SDU once the RLC SDU has been successfully reassembled by the UE 120. For example, the UE 120 may decode the first subset of encoded packets (e.g., the successfully received encoded packets) to obtain a set of source packets. The UE 120 may successfully obtain the single RLC SDU from the set of source packets (e.g., shown by reference number 750). The UE 120 may refrain from receiving and/or processing additional encoded packets associated with the single RLC SDU in the initial transmission based at least in part on successfully obtaining the single RLC SDU. For example, if another RLC PDU associated with the RLC SDU is received by the UE 120 as part of the initial transmission, then the UE 120 may discard (e.g., not process and/or not store) the RLC PDU. In other words, based at least in part on successfully obtaining the single RLC SDU, the UE 120 may refrain from decoding RLC PDUs and/or encoded packets (from the initial transmission) associated with the single RLC SDU. This may reduce a packet decoding latency and processing time. Additionally, this may conserve memory resources and/or processing resources of the UE 120 that would have otherwise been used to process, store, and/or decode the RLC PDUs and/or encoded packets associated with the successfully obtained RLC SDU.

As described elsewhere herein, the UE 120 may transmit, and the base station 110 may receive, the feedback message (e.g., the RLC status feedback message). In some aspects, the UE 120 may transmit the RLC status feedback message based at least in part on detecting a decoding failure associated with one or more RLC SDUs. In some aspects, the UE 120 may transmit the RLC status feedback message periodically (e.g., in accordance with a periodic timer and/or in accordance with a periodic schedule). The periodicity and/or an amount of time associated with the periodic timer may be indicated by the configuration information. In some aspects, the UE 120 may transmit the RLC status feedback message based at least in part on a trigger from the RLC entity associated with the base station 110. For example, the RLC entity of the base station 110 may cause the base station 110 to transmit, to the UE 120, a request for the RLC status feedback message (e.g., a polling request). For example, the UE 120 may receive, from the RLC entity associated with the base station 110, a request for the RLC status feedback message. The UE 120 may transmit the RLC status feedback message based at least in part on receiving the request.

The RLC status feedback message may indicate RLC SDUs (e.g., associated with the initial transmission) that have been successfully received by the UE 120, may indicate RLC SDUs that have not been successfully received by the UE 120, may indicate encoded packets that have not been successfully received by the UE 120, may indicate RLC PDUs that have not been successfully received by the UE 120, may indicate a number of encoded packets needed to successfully decode a given RLC SDU (e.g., that was not successfully received), may indicate number of encoded packets that have been successfully received associated with a given RLC SDU (e.g., that was not successfully received), and/or may indicate a rate adjustment command (e.g., to request a change in a number of RLC PDUs to be associated with each RLC SDU), among other examples. The UE 120 may identify RLC SDUs, RLC PDUs, and/or encoded packets that have not been successfully received based at least in part on sequence numbers and/or segmentation indices of received packets or received RLC SDUs. For example, a gap in sequence numbers of received RLC SDUs may indicate that an RLC SDU was not successfully received (e.g., if, among the successfully received and/or reassembled RLC SDUs, an RLC SDU with a sequence number of 1 and an RLC SDU with a sequence number of 3 are successfully received, then the UE 120 may determine that an RLC SDU with a sequence number of 2 was not successfully received). Similarly, a gap in sequence numbers of received encoded packets may indicate that an encoded packet was not successfully received by the UE 120.

The RLC status feedback message may indicate an ACK sequence number. The ACK sequence number may indicate that RLC SDU sequence numbers, associated with the initial transmission, less than the ACK sequence number were successfully received by the UE 120. In some aspects, the RLC status feedback message may indicate one or more first NACK sequence numbers. A first NACK sequence number may indicate an RLC SDU, associated with the initial transmission, that was not successfully received by the UE 120. In some aspects, the RLC status feedback message may indicate a first NACK sequence number and an indication of a number of additional encoded packets needed to successfully decode the RLC SDU indicated by the NACK sequence number. In some aspects, the RLC status feedback message may indicate a first NACK sequence number and an indication of a number of encoded packets from the first set of encoded packets (e.g., from the set of L encoded packets), associated with the RLC SDU indicated by the NACK sequence number, that were successfully received by the UE 120.

In some aspects, the RLC status feedback message may indicate a first NACK sequence number and one or more second NACK sequence numbers associated with the first NACK sequence number. A second NACK sequence number may indicate an encoded packet, associated with the RLC SDU indicated by the first NACK sequence number, that was not successfully received by the UE 120. In some aspects, the RLC status feedback message may indicate a first NACK sequence number, a second NACK sequence number, and one or more NACK segmentation indices. A NACK segmentation index may indicate an RLC PDU, associated with the RLC SDU (e.g., indicated by the first NACK sequence number) and the encoded packet (e.g., indicated by the second NACK sequence number), that was not successfully received by the UE 120.

Therefore, the information indicated in the RLC status feedback message may indicate, to the base station 110 (e.g., to the transmitter), RLC SDUs, RLC PDUS, and/or encoded packets that were successfully received by the UE 120. Additionally, or alternatively, the information indicated in the RLC status feedback message may indicate, to the base station 110, RLC SDUs, RLC PDUs, and/or encoded packets that were not successfully received by the UE 120. This may enable the base station 110 to construct and/or generate the retransmission associated with the initial transmission (shown by reference number 720) appropriately.

Figure 7D:
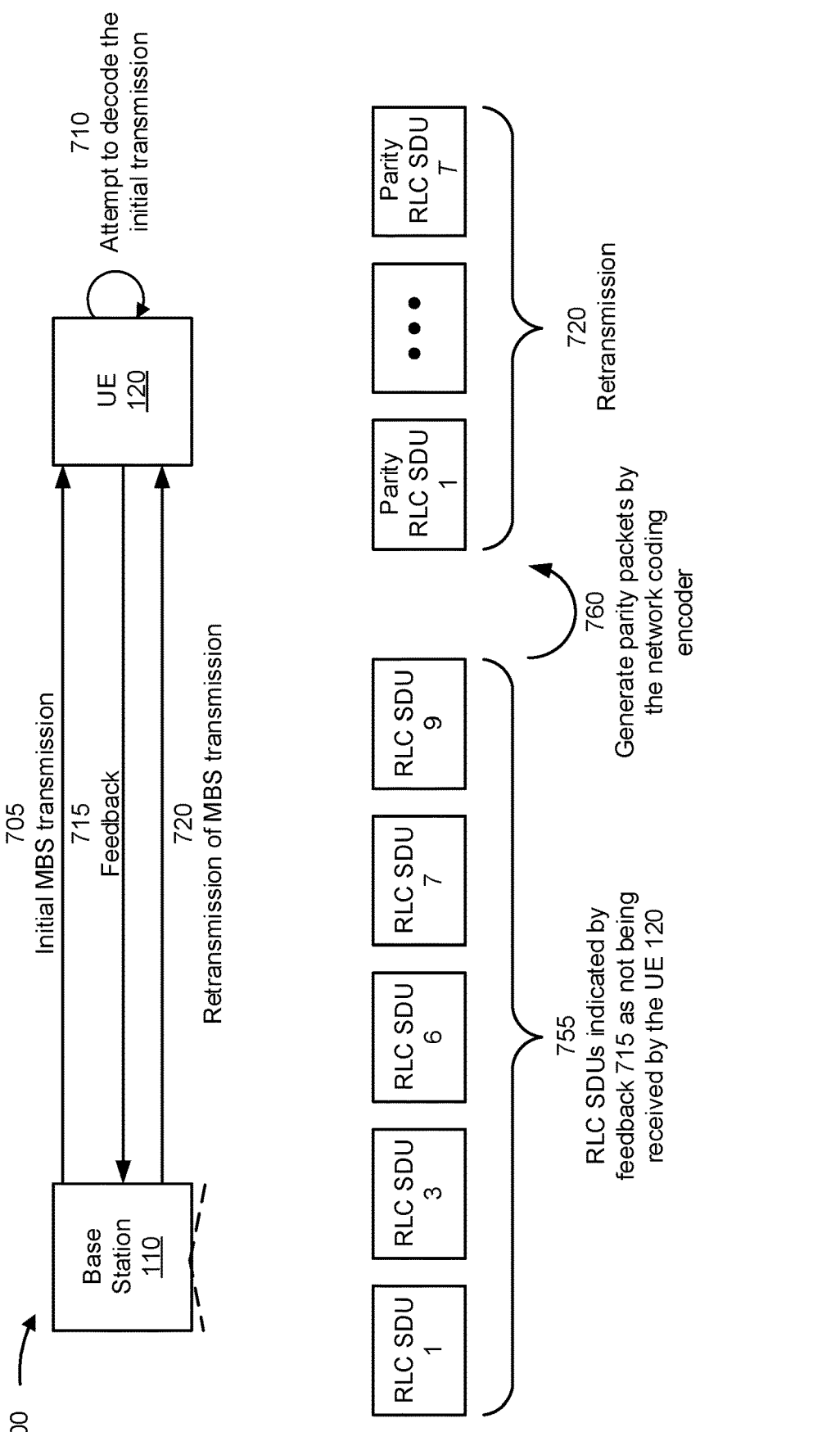

For example, as shown in FIG. 7D, the retransmission may be an RLC SDU level retransmission. "RLC SDU level retransmission" may refer to a retransmission of an initial MBS transmission that is generated based on and/or associated with RLC SDUs of the initial MBS transmission that were not successfully received by at least one UE associated with the MBS. For example, the RLC status feedback message may indicate, to the base station 110 (e.g., to the transmitter), RLC SDUs associated with the initial MBS transmission that were not successfully received by the UE 120. In other words, the RLC status feedback message may indicate one or more RLC SDUs that were not successfully received by the UE 120 (e.g., by indicating a NACK sequence number in the RLC status feedback message that is associated with an RLC SDU that was not successfully received by the UE 120. The base station 110 may identify one or more RLC SDUs that were not successfully received by the UE 120 (and/or other UEs 120 associated with the initial transmission) based at least in part on the RLC status feedback message (and/or other RLC status feedback messages received from the other UEs 120 associated with the initial transmission).

For example, as shown by reference number 755, the base station 110 may identify a set (e.g., one or more) of RLC SDUs that were not successfully received by UEs 120 associated with the initial transmission (e.g., RLC SDU 1, RLC SDU, 3, RLC SDU 6, RLC SDU 7, and RLC SDU 9 as shown in FIG. 7D). For example, the RLC status feedback message may include one or more ACK sequence numbers and/or one or more NACK sequence numbers. The base station 110 may identify the RLC SDUs that were successfully received and/or recovered by UEs 120 (e.g., all UEs 120) associated with the initial transmission based at least in part on the one or more ACK sequence numbers and/or one or more NACK sequence numbers indicated by RLC status feedback messages. The base station 110 may refrain from using RLC SDUs that were successfully received and/or recovered by UEs 120 associated with the initial transmission to generate the retransmission (e.g., to conserve resources).

As shown by reference number 760, the base station 110 may generate a second set of encoded packets using the one or more RLC SDUs as systematic source packets for a network coding procedure. For example, as described elsewhere herein, the retransmission may include, or may be associated with, a second set on encoded packets (e.g., that are at least partially different than the set of encoded packets included in the initial transmission). The base station 110 may generate the second set on encoded packets using the set of RLC SDUs that were not successfully received by UEs 120 associated with the initial transmission. For example, as shown in FIG. 7D, the base station 110 may generate a set of parity RLC SDUs (e.g., parity RLC SDU 1 through parity RLC SDU 7) using the set of RLC SDUs as systematic packets. The retransmission may be generated using the set of parity RLC SDUs via a network coding procedure in a similar manner as described elsewhere herein (e.g., each parity RLC SDU may be associated with a set of encoded packets in a similar manner as described above in connection with FIGS. 7A-7C).

The UE 120 may recover an RLC SDU that was not successfully received by the UE 120 based at least in part on RLC SDUs that were successfully received by the UE 120 from the initial transmission and based at least in part on parity RLC SDUS received in the retransmission. For example, the UE 120 may receive a second set of encoded packets (e.g., the second set of encoded packets may be generated from the one or more RLC SDUs indicated by the RLC status feedback message as described above). The UE 120 may decode the second set of encoded packets to obtain the one or more RLC SDUs based at least in part on the first set of encoded packets (e.g., associated with the initial transmission) and the second set of encoded packets (e.g., associated with the retransmission). The UE 120 may decode the second set of encoded packets in a similar manner as described in connection with FIG. 7C. For example, the UE 120 may recover and/or reassemble a parity RLC SDU from the second set of encoded packets associated with the retransmission. The UE 120 may be enabled to recover an RLC SDU associated with the initial transmission that was not successfully received by the UE 120 based at least in part on the recovered and/or reassembled parity RLC SDU(s) and based at least in part on one or more RLC SDUs associated with the initial transmission that were successfully received and/or reassembled by the UE 120.

Figure 7E:
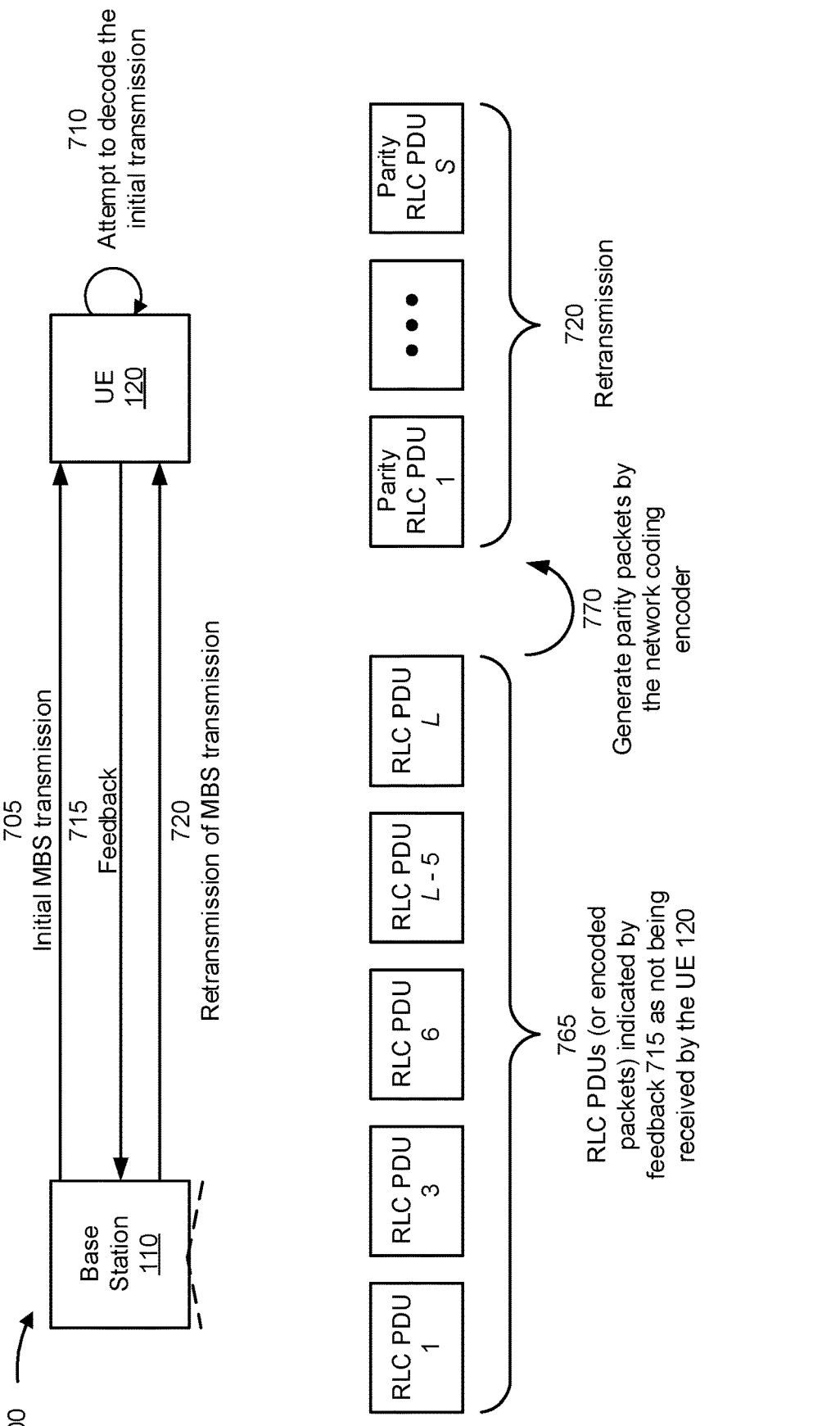

As shown in FIG. 7E, the retransmission may be an RLC PDU level retransmission. "RLC PDU level retransmission" may refer to a retransmission of an initial MBS transmission that is generated based on and/or associated with RLC PDUs and/or encoded packets of the initial MBS transmission that were not successfully received by at least one UE 120 associated with the MBS. For example, the RLC status feedback message may indicate, to the base station 110 (e.g., to the transmitter), RLC PDUs and/or encoded packets associated with the initial MBS transmission that were not successfully received by the UE 120. In other words, the RLC status feedback message may indicate one or more RLC PDUs and/or encoded packets that were not success- fully received by the UE 120 by indicating a first NACK sequence number (e.g., indicating an RLC SDU associated with the RLC PDU), indicating a second NACK sequence number (e.g., indicating an encoded packet associated with the RLC PDU), and/or indicating a NACK segmentation index (e.g., indicating a segmentation index associated with the RLC PDU) in the RLC status feedback message. In some aspects, the UE 120 may only indicate the first NACK sequence number and the second NACK sequence number (e.g., and not the NACK segmentation index). The base station 110 may identify one or more RLC PDUs and/or encoded packets that were not successfully received by the UE 120 (and/or other UEs 120 associated with the initial transmission) based at least in part on the RLC status feedback message (and/or other RLC status feedback mes- sages received from the other UEs 120 associated with the initial transmission).

For example, as shown by reference number 765, the base station 110 may identify one or more RLC PDUs (e.g., from the set of RLC PDUs associated with the initial transmis- sion) that were not successfully received by UEs 120 associated with the initial transmission. While FIG. 7E shows RLC PDUs that were not successfully received by the base station 110, in some aspects, the base station 110 may identify one or more encoded packets (e.g., from the set of encoded packets associated with the initial transmission) that were not successfully received by UEs 120 associated with the initial transmission. The base station 110 may identify the RLC PDUs and/or encoded packets that were successfully received and/or recovered by UEs 120 (e.g., all UEs 120) associated with the initial transmission based at least in part on the one or more ACK sequence numbers, one or more NACK sequence numbers, and/or one or more NACK segmentation indices indicated by RLC status feed- back messages. The base station 110 may refrain from using RLC PDUs and/or encoded packets that were successfully received and/or recovered by UEs 120 associated with the initial transmission to generate the retransmission (e.g., to conserve resources).

As shown by reference number 770, the base station 110 may generate a second set of encoded packets using the one or more RLC PDUs and/or encoded packets as systematic source packets for a network coding procedure. For example, as described elsewhere herein, the retransmission may include, or may be associated with, a second set on encoded packets (e.g., that are at least partially different than the set of encoded packets included in the initial transmis- sion). The base station 110 may generate the second set on encoded packets using the set of RLC PDUs and/or encoded packets that were not successfully received by UEs 120 associated with the initial transmission. For example, as shown in FIG. 7E, the base station 110 may generate a set of parity RLC PDUs and/or parity encoded packets (e.g., parity RLC SDU 1 through parity RLC SDU S) using the set of RLC PDUs and/or encoded packets as systematic packets. The retransmission may be generated using the set of parity RLC PDUs and/or parity encoded packets via a network coding procedure in a similar manner as described elsewhere herein. The retransmission (shown by reference number 720) may include, or may be generated using, the parity RLC PDUs and/or the parity encoded packets.

The UE 120 may recover an RLC PDU and/or an encoded packet that was not successfully received by the UE 120 based at least in part on RLC PDUs or encoded packets that were successfully received by the UE 120 from the initial transmission and based at least in part on parity RLC PDUs and/or parity encoded packets received in the retransmis- sion. For example, the UE 120 may receive a second set of encoded packets (e.g., the second set of encoded packets may be generated from the one or more RLC PDUs and/or encoded packets indicated by the RLC status feedback message as described above). The UE 120 may decode the second set of encoded packets to obtain the one or more RLC PDUs based at least in part on the first set of encoded packets (e.g., associated with the initial transmission) and the second set of encoded packets (e.g., associated with the retransmission). The UE 120 may decode the second set of encoded packets in a similar manner as described in con- nection with FIG. 7C. For example, the UE 120 may recover and/or reassemble a parity RLC PDU from the second set of encoded packets associated with the retransmission. The UE 120 may be enabled to recover an RLC PDU associated with the initial transmission that was not successfully received by the UE 120 based at least in part on the recovered and/or reassembled parity RLC PDU(s) and based at least in part on one or more RLC PDUs associated with the initial trans- mission that were successfully received and/or reassembled by the UE 120. The UE 120 may recover an encoded packet using a parity encoded packet and a successfully received encoded packet from the initial transmission in a similar manner.

Figure 7F:
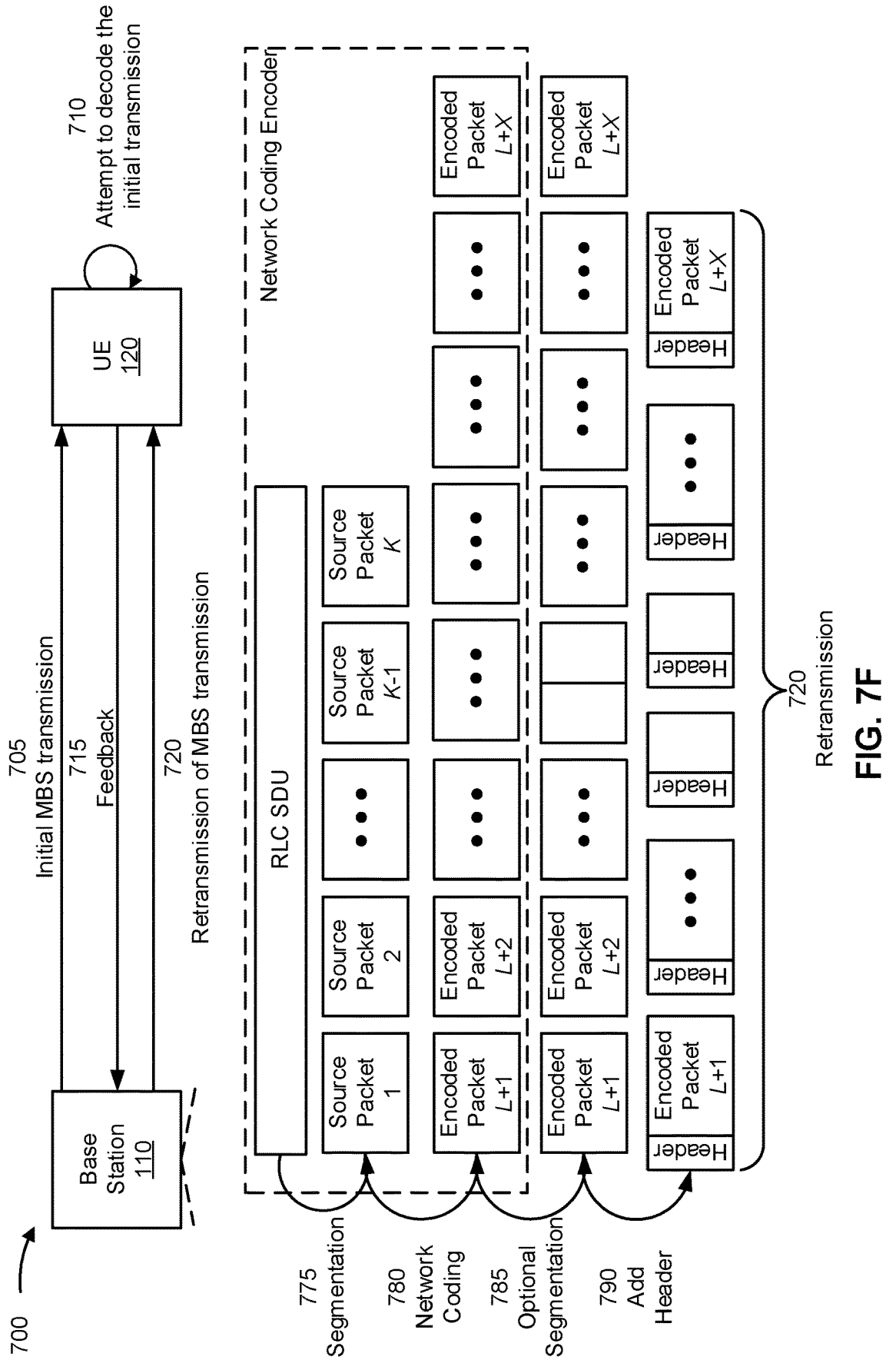

As shown in FIG. 7F, the retransmission may be an RLC encoded packet level retransmission. "RLC encoded packet level retransmission" may refer to a retransmission of an initial MBS transmission that is generated based on, and/or associated with, encoded packets of the initial MBS transmission that were not transmitted in the initial transmission. For example, for an RLC SDU associated with the initial transmission, the base station 110 may perform segmentation of the RLC SDU (e.g., shown by reference number 775) in a similar manner as described above in connection with reference number 725. The base station 110 may perform network coding (e.g., shown by reference number 780) in a similar manner as described above in connection with reference number 730 to generate a set of encoded packets. For example, FIG. 7C described the first set of encoded packets (e.g., associated with the initial transmission) as including a set of L encoded packets. However, the base station 110 may generate additional encoded packets (e.g., encoded packets L+1 through L+X), where the additional encoded packets are not associated with, or transmitted in, the initial transmission. The base station 110 may store the encoded packets (e.g., the set of L encoded packets and/or the encoded packets L+1 through L+X) in a buffer. In other words, the set of L encoded packets may be a subset of a set of encoded packets generated by the base station 110 (e.g., and the encoded packets L+1 through L+X may be another subset of the set of encoded packets).

In some aspects, for an RLC encoded packet level retransmission, the RLC status feedback message may indicate an RLC SDU that was not successfully received by the UE 120 and may indicate a number of additional encoded packets needed to successfully decode the RLC SDU. The base station 110 may generate the retransmission based at least in part on the number of additional encoded packets needed to successfully decode the RLC SDU. For example, the base station 110 may identify encoded packets associated with the RLC SDU indicated by the RLC status feedback message (e.g., that were not transmitted in the initial transmission). The base station 110 may select or pull (e.g., from the buffer) a set of additional encoded packets (e.g., a second set of encoded packets) associated with the RLC SDU, where the number of additional encoded packets selected by the base station 110 is based at least in part on the number of additional encoded packets needed to successfully decode the RLC SDU (e.g., as indicated by the UE 120). For example, the base station 110 may select or pull (e.g., from the buffer) a set of additional encoded packets (e.g., a second set of encoded packets) associated with the RLC SDU, where the number of additional encoded packets selected by the base station 110 is equal to or greater than the number of additional encoded packets needed for the UE 120 to successfully decode the RLC SDU. For example, the value of X may be based at least in part on the number of additional encoded packets needed for the UE 120 to successfully decode the RLC SDU.

Indicating the number of additional encoded packets needed for the UE 120 to successfully decode the RLC SDU may conserve resources associated with transmitting the RLC status feedback message because a size associated with the RLC status feedback message may be reduced. For example, rather than indicating each encoded packet and/or each RLC PDU (associated with the RLC SDU) that was not successfully received by the UE 120, the UE 120 may simply indicate the number of additional encoded packets needed for the UE 120 to successfully decode the RLC SDU. This requires less size (e.g., a smaller number of bits) than a size needed to indicate multiple sequence numbers (e.g., to indicate encoded packets and/or each RLC PDUs that were not successfully received by the UE 120) in the RLC status feedback message.

As shown in FIG. 7F, the base station 110 may generate the retransmission in a similar manner as described above in connection with FIG. 7B. For example, as shown by reference number 785, the base station 110 may perform optional segmentation on the second set of encoded packets (e.g., encoded packets L+1 through L+X). As shown by reference number 790, the base station 110 may add a header to the (segmented) encoded packets to generate a set of RLC PDUs, in a similar manner as described elsewhere herein.

The UE 120 may receive the second set of encoded packets (e.g., the encoded packets L+1 through L+X). The UE 120 may decode encoded packets, included in the first set of encoded packets (e.g., associated with the initial transmission) and the second set of encoded packets (e.g., associated with the retransmission), that include a sequence number associated with an RLC SDU in a header of the encoded packets, to obtain the RLC SDU. In other words, the UE 120 may process encoded packets associated with an RLC SDU together, regardless of whether the encoded packets are associated with the initial transmission or the retransmission. For example, the network coding decoder configured on the UE 120 may only be aware of the total number of encoded packets received (e.g., associated with each RLC SDU). The network coding decoder (e.g., in the RLC entity configured on the UE 120), may receive encoded packets from one or more MAC entities and may process the encoded packets together if the encoded packets are associated with the same RLC SDU. For example, some encoded packets may be transmitted via the initial transmission, via the retransmission, via the multicast traffic channel, and/or via the dedicated traffic channel. All encoded packets (e.g., regardless of their source and/or how or when the packets were transmitted) associated with the RLC SDU may be processed and/or decoded by the network coding decoder to obtain the RLC SDU.

As a result, the MBS transmissions and MBS retransmissions may use network coding to improve the reliability and efficiency associated with the MBS. For example, network coding may be used in upper layers, such as the RLC layer, by transmitters and receivers associated with the MBS to improve the reliability and efficiency associated with the MBS, as described herein. Additionally, both multicast traffic channels and the dedicated traffic channels may be used for MBS transmissions (and retransmissions), where the MBS transmissions (and retransmissions) use network coding to improve the reliability and efficiency associated with the MBS.

As indicated above, FIGS. 7A-7F are provided as examples. Other examples may differ from what is described with respect to FIGS. 7A-7F.

FIG. 8 is a diagram illustrating an example process 800 performed, for example, by a UE, in accordance with the present disclosure. Example process 800 is an example where the UE (e.g., UE 120) performs operations associated with network coding in an RLC layer for multicast/broadcast transmissions.

As shown in FIG. 8, in some aspects, process 800 may include receiving, from a base station, configuration information indicating that network coding is enabled for initial transmissions associated with an MBS and indicating that network coding is enabled for retransmissions associated with the MBS (block 810). For example, the UE (e.g., using communication manager 140 and/or reception component 1002, depicted in FIG. 10) may receive, from a base station, configuration information indicating that network coding is enabled for initial transmissions associated with an MBS and indicating that network coding is enabled for retransmissions associated with the MBS, as described above.

As further shown in FIG. 8, in some aspects, process 800 may include receiving, via a multicast traffic channel or a dedicated traffic channel, an initial transmission associated with the MBS, wherein the initial transmission is associated with a first set of encoded packets (block 820). For example, the UE (e.g., using communication manager 140 and/or reception component 1002, depicted in FIG. 10) may receive, via a multicast traffic channel or a dedicated traffic channel, an initial transmission associated with the MBS, wherein the initial transmission is associated with a first set of encoded packets, as described above.

As further shown in FIG. 8, in some aspects, process 800 may include transmitting, based at least in part on decoding the initial transmission, an RLC status feedback message associated with the initial transmission (block 830). For example, the UE (e.g., using communication manager 140 and/or transmission component 1004, depicted in FIG. 10) may transmit, based at least in part on decoding the initial transmission, an RLC status feedback message associated with the initial transmission, as described above.

As further shown in FIG. 8, in some aspects, process 800 may include receiving, via the multicast traffic channel or the dedicated traffic channel, a retransmission associated with the initial transmission, wherein the retransmission is associated with a second set of encoded packets (block 840). For example, the UE (e.g., using communication manager 140 and/or reception component 1002, depicted in FIG. 10) may receive, via the multicast traffic channel or the dedicated traffic channel, a retransmission associated with the initial transmission, wherein the retransmission is associated with a second set of encoded packets, as described above.

Process 800 may include additional aspects, such as any single aspect or any combination of aspects described below and/or in connection with one or more other processes described elsewhere herein.

In a first aspect, process 800 includes transmitting a measurement report indicating one or more measurement values, wherein the initial transmission is received via the multicast traffic channel if the one or more measurement values satisfy a first threshold, or is received via the dedicated traffic channel if the one or more measurement values do not satisfy the first threshold.

In a second aspect, alone or in combination with the first aspect, receiving the initial transmission includes receiving the initial transmission via the multicast traffic channel, and wherein receiving the retransmission includes receiving the retransmission via the dedicated traffic channel.

In a third aspect, alone or in combination with one or more of the first and second aspects, receiving the initial transmission includes receiving the initial transmission via the multicast traffic channel, and wherein the retransmission is received via the multicast traffic channel if a number of UEs associated with the initial transmission that indicate a need for the retransmission satisfies a second threshold, or is received via the dedicated traffic channel if the number of UEs does not satisfy the second threshold.

In a fourth aspect, alone or in combination with one or more of the first through third aspects, the configuration information indicates at least one of one or more thresholds associated with MBS channel selection between the multicast traffic channel or the dedicated traffic channel, an indication of a periodic schedule associated with providing measurement reports from a medium access control entity to an RLC entity, or a threshold associated with a number of UEs that indicate a need for the retransmission.

In a fifth aspect, alone or in combination with one or more of the first through fourth aspects, the retransmission is at least one of an RLC SDU level retransmission, an RLC PDU level retransmission, or an RLC encoded packet level transmission.

In a sixth aspect, alone or in combination with one or more of the first through fifth aspects, the first set of encoded packets are associated with a set of RLC PDUs, wherein the set of RLC PDUs are associated with a single RLC SDU, and wherein a header of an RLC PDU, of the set of RLC PDUs, indicates a first sequence number indicating the single RLC SDU associated with the RLC PDU, a second sequence number indicating an encoded packet, of the first set of encoded packets, associated with the RLC PDU, and a segmentation index identifying a segmentation associated with the RLC PDU.

In a seventh aspect, alone or in combination with one or more of the first through sixth aspects, receiving the initial transmission includes receiving the RLC PDU indicating the first sequence number, the second sequence number, and the segmentation index, failing to receive another RLC PDU, from the set of RLC PDUs, indicating the first sequence number, the second sequence number, and another segmentation index, and determining that the encoded packet associated with the second sequence number is not successfully received by the UE.

In an eighth aspect, alone or in combination with one or more of the first through seventh aspects, receiving the initial transmission includes receiving the set of RLC PDUs, wherein receiving the set of RLC PDUs includes successfully receiving a first subset of encoded packets, from the first set of encoded packets, and failing to receive a second subset of encoded packets, from the first set of encoded packets.

In a ninth aspect, alone or in combination with one or more of the first through eighth aspects, process 800 includes detecting a decoding failure if a number of encoded packets included in the first subset of encoded packets is less than a third threshold, wherein the third threshold is based at least in part on a number of source packets associated with the first set of encoded packets.

In a tenth aspect, alone or in combination with one or more of the first through ninth aspects, process 800 includes decoding the first subset of encoded packets to obtain a set of source packets associated with the first set of encoded packets, wherein the single RLC SDU is obtained from the set of source packets.

In an eleventh aspect, alone or in combination with one or more of the first through tenth aspects, the configuration information indicates a fourth threshold associated with a number of received encoded packets, and process 800 includes decoding the first subset of encoded packets to obtain a set of source packets associated with the first set of encoded packets, and reassembling the set of source packets to obtain the single RLC SDU based at least in part on a number of encoded packets included in the first subset of encoded packets satisfying the fourth threshold.

In a twelfth aspect, alone or in combination with one or more of the first through eleventh aspects, process 800 includes decoding the first subset of encoded packets to obtain a set of source packets associated with the first set of encoded packets and successfully obtaining the single RLC SDU from the set of source packets, and refraining from receiving additional encoded packets associated with the single RLC SDU in the initial transmission based at least in part on successfully obtaining the single RLC SDU.

In a thirteenth aspect, alone or in combination with one or more of the first through twelfth aspects, the retransmission is an RLC SDU level retransmission, wherein the RLC status feedback message indicates one or more RLC SDUs that were not successfully received by the UE, and wherein receiving the retransmission includes receiving the second set of encoded packets, wherein the second set of encoded packets are generated from the one or more RLC SDUs indicated by the RLC status feedback message, and decoding the second set of encoded packets to obtain the one or more RLC SDUs based at least in part on the first set of encoded packets and the second set of encoded packets.

In a fourteenth aspect, alone or in combination with one or more of the first through thirteenth aspects, the retransmission is an RLC PDU level retransmission, wherein the RLC status feedback message indicates one or more RLC PDUs or one or more encoded packets that were not successfully received by the UE, and wherein receiving the retransmission includes receiving the second set of encoded packets, wherein the second set of encoded packets are generated from the one or more RLC PDUs or the one or more encoded packets indicated by the RLC status feedback message, and decoding the second set of encoded packets to obtain the one or more RLC PDUs based at least in part on the first set of encoded packets and the second set of encoded packets.

In a fifteenth aspect, alone or in combination with one or more of the first through fourteenth aspects, the retransmission is an RLC encoded packet level retransmission, wherein the RLC status feedback message indicates an RLC SDU that was not successfully received by the UE and indicates a number of additional encoded packets needed to successfully decode the RLC SDU, and wherein receiving the retransmission includes receiving the second set of encoded packets, wherein a number of encoded packets included in the second set of encoded packets is based at least in part on the number of additional encoded packets needed to successfully decode the RLC SDU, and decoding encoded packets, included in the first set of encoded packets and the second set of encoded packets, that include a sequence number associated with the RLC SDU in a header of the encoded packets, to obtain the RLC SDU.

In a sixteenth aspect, alone or in combination with one or more of the first through fifteenth aspects, transmitting the RLC status feedback message includes transmitting the RLC status feedback message in accordance with a periodic schedule.

In a seventeenth aspect, alone or in combination with one or more of the first through sixteenth aspects, transmitting the RLC status feedback message includes receiving, from an RLC entity, a request for the RLC status feedback message, and transmitting the RLC status feedback message based at least in part on receiving the request.

In an eighteenth aspect, alone or in combination with one or more of the first through seventeenth aspects, process 800 includes reporting, from a MAC entity to an RLC entity, a measurement report indicating one or more measurement values, wherein the one or more measurement values are used for MBS channel selection between the multicast traffic channel or the dedicated traffic channel, and wherein the measurement report is a periodic measurement report or an aperiodic measurement report.

In a nineteenth aspect, alone or in combination with one or more of the first through eighteenth aspects, the RLC status feedback message indicates a number of additional encoded packets needed to successfully decode an RLC SDU, and wherein the number of additional encoded packets is used for MBS channel selection between the multicast traffic channel or the dedicated traffic channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
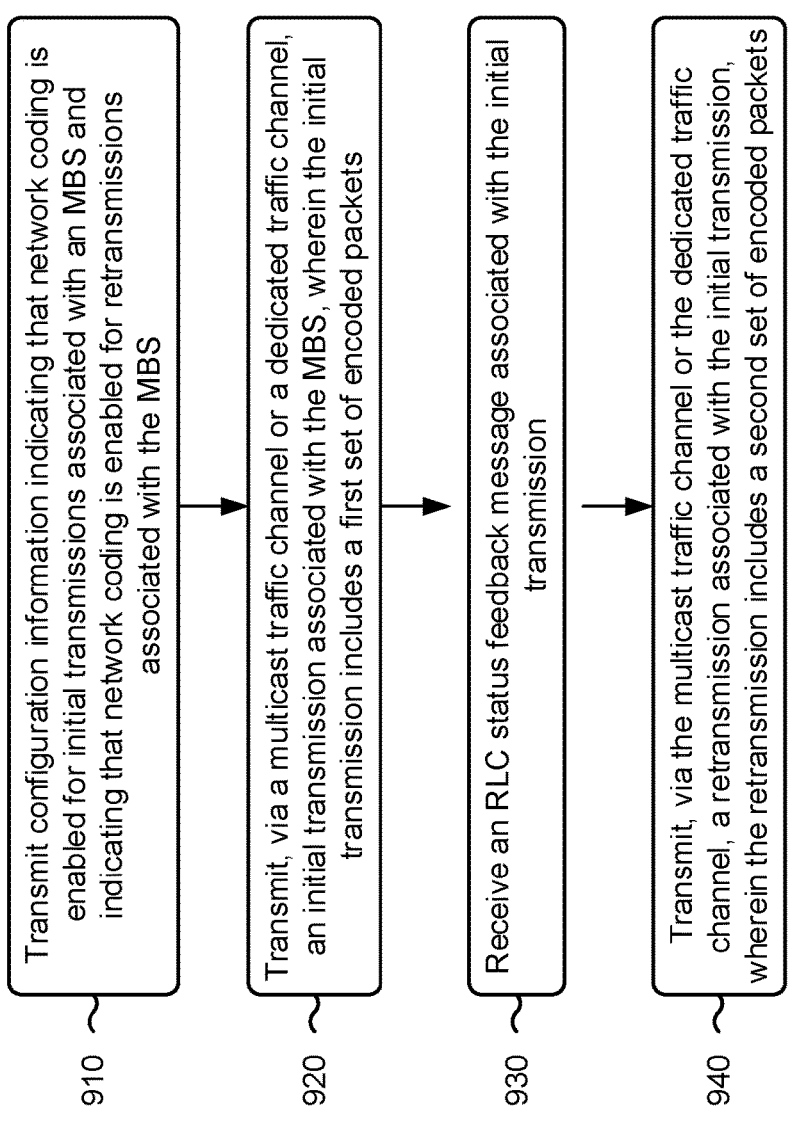

FIG. 9 is a diagram illustrating an example process 900 performed, for example, by a base station, in accordance with the present disclosure. Example process 900 is an example where the base station (e.g., base station 110) performs operations associated with network coding in an RLC layer for multicast/broadcast transmissions.

As shown in FIG. 9, in some aspects, process 900 may include transmitting configuration information indicating that network coding is enabled for initial transmissions associated with an MBS and indicating that network coding is enabled for retransmissions associated with the MBS (block 910). For example, the base station (e.g., using communication manager 150 and/or transmission component 1104, depicted in FIG. 11) may transmit configuration information indicating that network coding is enabled for initial transmissions associated with an MBS and indicating that network coding is enabled for retransmissions associated with the MBS, as described above.

As further shown in FIG. 9, in some aspects, process 900 may include transmitting, via a multicast traffic channel or a dedicated traffic channel, an initial transmission associated with the MBS, wherein the initial transmission includes a first set of encoded packets (block 920). For example, the base station (e.g., using communication manager 150 and/or transmission component 1104, depicted in FIG. 11) may transmit, via a multicast traffic channel or a dedicated traffic channel, an initial transmission associated with the MBS, wherein the initial transmission includes a first set of encoded packets, as described above.

As further shown in FIG. 9, in some aspects, process 900 may include receiving an RLC status feedback message associated with the initial transmission (block 930). For example, the base station (e.g., using communication manager 150 and/or reception component 1102, depicted in FIG. 11) may receive an RLC status feedback message associated with the initial transmission, as described above.

As further shown in FIG. 9, in some aspects, process 900 may include transmitting, via the multicast traffic channel or the dedicated traffic channel, a retransmission associated with the initial transmission, wherein the retransmission includes a second set of encoded packets (block 940). For example, the base station (e.g., using communication manager 150 and/or transmission component 1104, depicted in FIG. 11) may transmit, via the multicast traffic channel or the dedicated traffic channel, a retransmission associated with the initial transmission, wherein the retransmission includes a second set of encoded packets, as described above.

Process 900 may include additional aspects, such as any single aspect or any combination of aspects described below and/or in connection with one or more other processes described elsewhere herein.

In a first aspect, process 900 includes receiving a measurement report indicating one or more measurement values, wherein the initial transmission is received via the multicast traffic channel if the one or more measurement values satisfy a first threshold, or is received via the dedicated traffic channel if the one or more measurement values do not satisfy the first threshold.

In a second aspect, alone or in combination with the first aspect, transmitting the initial transmission includes transmitting the initial transmission via the multicast traffic channel, and wherein transmitting the retransmission includes transmitting the retransmission via the dedicated traffic channel.

In a third aspect, alone or in combination with one or more of the first and second aspects, transmitting the initial transmission includes transmitting the initial transmission via the multicast traffic channel, and wherein the retransmission is transmitted via the multicast traffic channel if a number of UEs associated with the initial transmission that indicate a need for the retransmission satisfies a second threshold, or is transmitted via the dedicated traffic channel if the number of UEs does not satisfy the second threshold.

In a fourth aspect, alone or in combination with one or more of the first through third aspects, the configuration information indicates at least one of one or more thresholds associated with MBS channel selection between the multicast traffic channel or the dedicated traffic channel, an indication of a periodic schedule associated with providing measurement reports from a medium access control entity to an RLC entity, or a threshold associated with a number of UEs that indicate a need for the retransmission.

In a fifth aspect, alone or in combination with one or more of the first through fourth aspects, the retransmission is at least one of an RLC SDU level retransmission, an RLC PDU level retransmission, or an RLC encoded packet level transmission.

In a sixth aspect, alone or in combination with one or more of the first through fifth aspects, the first set of encoded packets are associated with a set of RLC PDUs, wherein the set of RLC PDUs are associated with a single RLC SDU, and wherein a header of an RLC PDU, of the set of RLC PDUs, indicates a first sequence number indicating the single RLC SDU associated with the RLC PDU, a second sequence number indicating an encoded packet, of the first set of encoded packets, associated with the RLC PDU, and a segmentation index identifying a segmentation associated with the RLC PDU.

In a seventh aspect, alone or in combination with one or more of the first through sixth aspects, transmitting the initial transmission includes generating a set of source packets from the single RLC SDU, performing network coding to generate the first set of encoded packets from the set of source packets, segmenting at least one encoded packet of the first set of encoded packets into a first segmented encoded packet and a second segmented encoded packet, and adding a first header to the first segmented encoded packet to form the RLC PDU, wherein the header indicates the first sequence number, the second sequence number, and the segmentation index, and adding a second header to the second segmented encoded packet to form another RLC PDU, wherein the header indicates the first sequence number, the second sequence number, and another segmentation index.

In an eighth aspect, alone or in combination with one or more of the first through seventh aspects, the retransmission is an RLC SDU level retransmission, wherein the RLC status feedback message indicates one or more RLC SDUs that were not successfully received, and wherein transmitting the retransmission includes generating the second set of encoded packets using the one or more RLC SDUs as systematic source packets, and transmitting the second set of encoded packets.

In a ninth aspect, alone or in combination with one or more of the first through eighth aspects, the retransmission is an RLC PDU level retransmission, wherein the RLC status feedback message indicates one or more RLC PDUs that were not successfully received, and wherein transmitting the retransmission includes generating the second set of encoded packets using the one or more RLC PDUs as systematic source packets, and transmitting the second set of encoded packets.

In a tenth aspect, alone or in combination with one or more of the first through ninth aspects, process 900 includes generating a third set of encoded packets associated with an RLC SDU, wherein the first set of encoded packets are a subset of the third set of encoded packets.

In an eleventh aspect, alone or in combination with one or more of the first through tenth aspects, the retransmission is an RLC encoded packet level retransmission, wherein the RLC status feedback message indicates that the RLC SDU was not successfully received and indicates a number of additional encoded packets needed to successfully decode the RLC SDU, and wherein transmitting the retransmission includes transmitting the second set of encoded packets, wherein a number of encoded packets included in the second set of encoded packets is based at least in part on the number of additional encoded packets needed to successfully decode the RLC SDU.

In a twelfth aspect, alone or in combination with one or more of the first through eleventh aspects, receiving the RLC status feedback message includes receiving the RLC status feedback message in accordance with a periodic schedule.

In a thirteenth aspect, alone or in combination with one or more of the first through twelfth aspects, receiving the RLC status feedback message includes transmitting a request for the RLC status feedback message, and receiving the RLC status feedback message based at least in part on transmitting the request.

In a fourteenth aspect, alone or in combination with one or more of the first through thirteenth aspects, process 900 includes receiving, from one or more UEs associated with the MBS, a measurement report indicating one or more measurement values, wherein the one or more measurement values are used for MBS channel selection between the multicast traffic channel or the dedicated traffic channel, and wherein the measurement report is a periodic measurement report or an aperiodic measurement report.

In a fifteenth aspect, alone or in combination with one or more of the first through fourteenth aspects, the RLC status feedback message indicates a number of additional encoded packets needed to successfully decode an RLC SDU, and wherein the number of additional encoded packets is used for MBS channel selection between the multicast traffic channel or the dedicated traffic channel.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
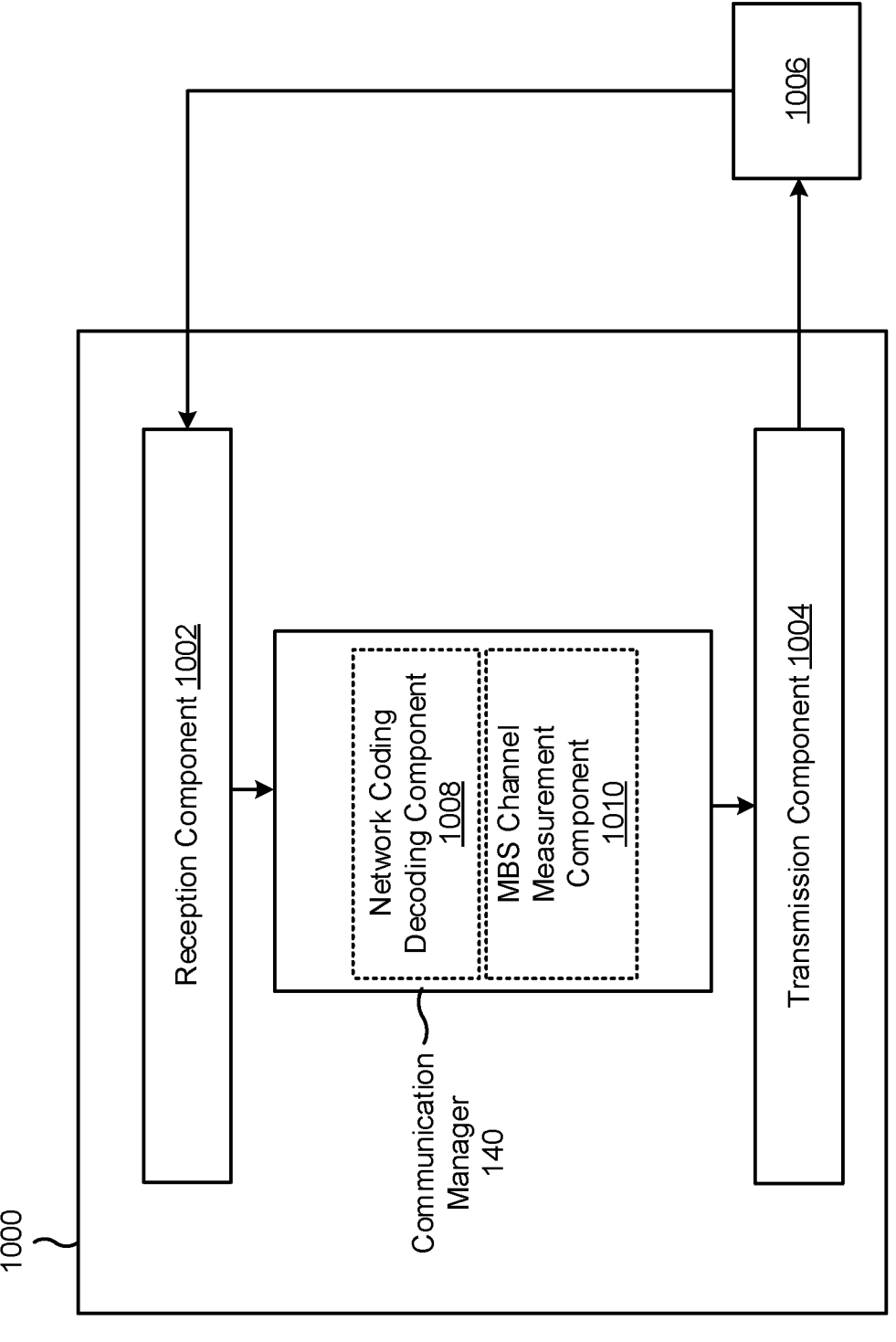
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a network coding decoding component 1008 and/or an MBS channel measurement component 1010, among other examples.

In some aspects, the apparatus 1000 may be configured to perform one or more operations described herein in connection with FIGS. 7A-7F. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station, configuration information indicating that network coding is enabled for initial transmissions associated with an MBS and indicating that network coding is enabled for retransmissions associated with the MBS. The reception component 1002 may receive, via a multicast traffic channel or a dedicated traffic channel, an initial transmission associated with the MBS, wherein the initial transmission is associated with a first set of encoded packets. The transmission component 1004 may transmit, based at least in part on decoding the initial transmission, an RLC status feedback message associated with the initial transmission. The reception component 1002 may receive, via the multicast traffic channel or the dedicated traffic channel, a retransmission associated with the initial transmission, wherein the retransmission is associated with a second set of encoded packets.

The transmission component 1004 may transmit a measurement report indicating one or more measurement values, wherein the initial transmission is received via the multicast traffic channel if the one or more measurement values satisfy a first threshold, or is received via the dedicated traffic channel if the one or more measurement values do not satisfy the first threshold.

The network coding decoding component 1008 may detect a decoding failure if a number of encoded packets included in the first subset of encoded packets is less than a third threshold, wherein the third threshold is based at least in part on a number of source packets associated with the first set of encoded packets.

The network coding decoding component 1008 may decode the first subset of encoded packets to obtain a set of source packets associated with the first set of encoded packets, wherein the single RLC SDU is obtained from the set of source packets.

The network coding decoding component 1008 may decode the first subset of encoded packets to obtain a set of source packets associated with the first set of encoded packets and successfully obtaining the single RLC SDU from the set of source packets.

The network coding decoding component 1008 may refrain from receiving additional encoded packets associated with the single RLC SDU in the initial transmission based at least in part on successfully obtaining the single RLC SDU.

The MBS channel measurement component 1010 may report, from a MAC entity to an RLC entity, a measurement report indicating one or more measurement values, wherein the one or more measurement values are used for MBS channel selection between the multicast traffic channel or the dedicated traffic channel, and wherein the measurement report is a periodic measurement report or an aperiodic measurement report.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
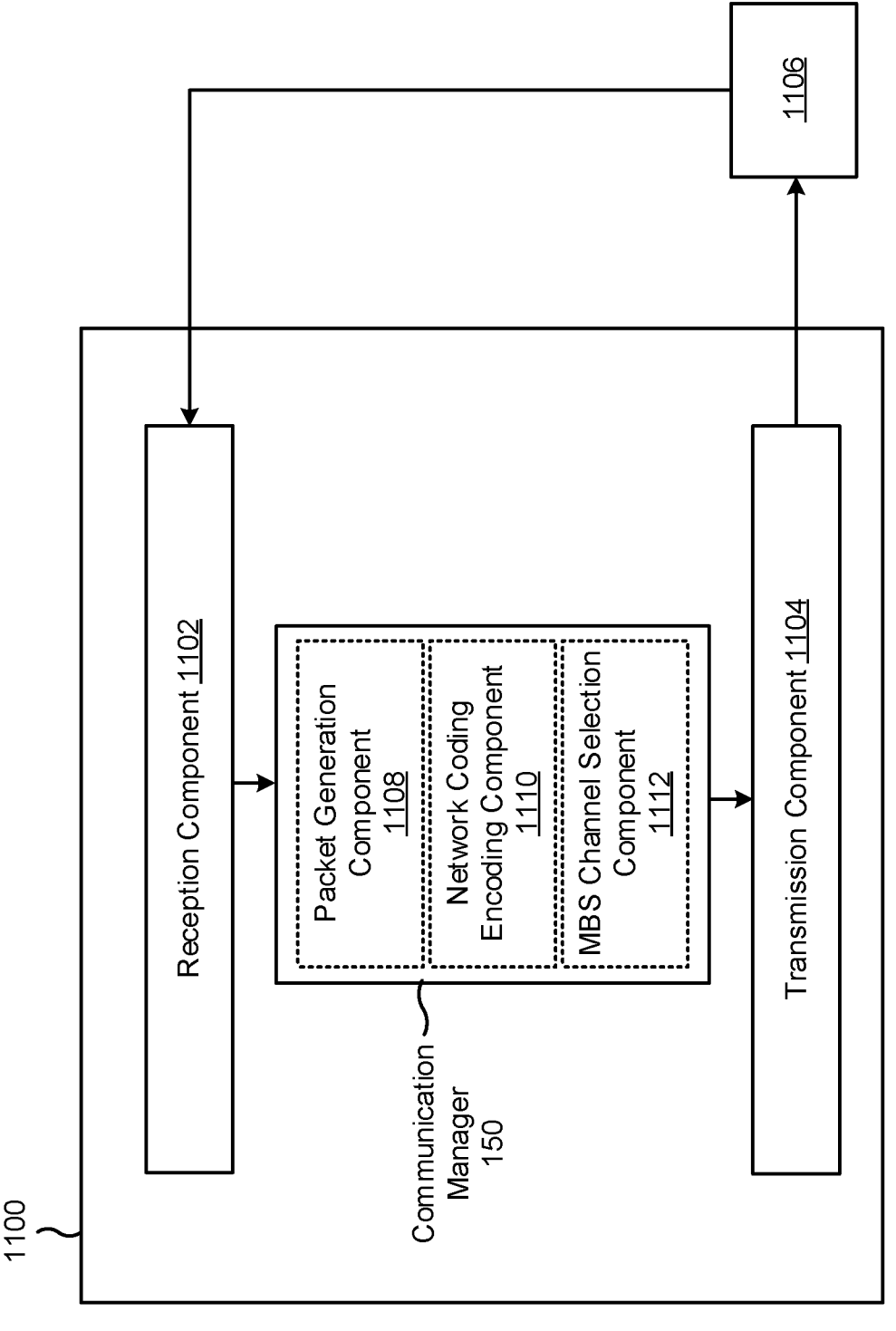

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a packet generation component 1108, a network coding encoding component 1110, or an MBS channel selection component 1112, among other examples.

In some aspects, the apparatus 1100 may be configured to perform one or more operations described herein in connection with FIGS. 7A-7F. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit configuration information indicating that network coding is enabled for initial transmissions associated with an MBS and indicating that network coding is enabled for retransmissions associated with the MBS. The transmission component 1104 may transmit, via a multicast traffic channel or a dedicated traffic channel, an initial transmission associated with the MBS, wherein the initial transmission includes a first set of encoded packets. The reception component 1102 may receive an RLC status feedback message associated with the initial transmission. The transmission component 1104 may transmit, via the multicast traffic channel or the dedicated traffic channel, a retransmission associated with the initial transmission, wherein the retransmission includes a second set of encoded packets.

The reception component 1102 may receive a measurement report indicating one or more measurement values, wherein the initial transmission is received via the multicast traffic channel if the one or more measurement values satisfy a first threshold, or is received via the dedicated traffic channel if the one or more measurement values do not satisfy the first threshold.

The packet generation component 1108 may generate a third set of encoded packets associated with an RLC SDU, wherein the first set of encoded packets are a subset of the third set of encoded packets.

The reception component 1102 may receive, from one or more UEs associated with the MBS, a measurement report indicating one or more measurement values, wherein the one or more measurement values are used for MBS channel selection between the multicast traffic channel or the dedicated traffic channel, and wherein the measurement report is a periodic measurement report or an aperiodic measurement report.

The network coding encoding component 1110 may perform network coding to generate the first set of encoded packets and/or the second set of encoded packets, as described in more detail elsewhere herein.

The MBS channel selection component 1112 may select a channel, from the multicast traffic channel and the dedicated traffic channel, to transmit the initial transmission and/or the retransmission based at least in part on one or more measurement values associated with a UE associated with the MBS, as described in more detail elsewhere herein.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, configuration information indicating that network coding is enabled for initial transmissions associated with a multicast/broadcast service (MBS) and indicating that network coding is enabled for retransmissions associated with the MBS; receiving, via a multicast traffic channel or a dedicated traffic channel, an initial transmission associated with the MBS, wherein the initial transmission is associated with a first set of encoded packets; transmitting, based at least in part on decoding the initial transmission, a radio link control (RLC) status feedback message associated with the initial transmission; and receiving, via the multicast traffic channel or the dedicated traffic channel, a retransmission associated with the initial transmission, wherein the retransmission is associated with a second set of encoded packets.

Aspect 2: The method of Aspect 1, further comprising: transmitting a measurement report indicating one or more measurement values, wherein the initial transmission is received via the multicast traffic channel if the one or more measurement values satisfy a first threshold, or is received via the dedicated traffic channel if the one or more measurement values do not satisfy the first threshold.

Aspect 3: The method of any of Aspects 1-2, wherein receiving the initial transmission comprises receiving the initial transmission via the multicast traffic channel, and wherein receiving the retransmission comprises receiving the retransmission via the dedicated traffic channel.

Aspect 4: The method of any of Aspects 1-2, wherein receiving the initial transmission comprises receiving the initial transmission via the multicast traffic channel; and wherein the retransmission is received via the multicast traffic channel if a number of UEs associated with the initial transmission that indicate a need for the retransmission satisfies a second threshold, or is received via the dedicated traffic channel if the number of UEs does not satisfy the second threshold.

Aspect 5: The method of any of Aspects 1-4, wherein the configuration information indicates at least one of: one or more thresholds associated with MBS channel selection between the multicast traffic channel or the dedicated traffic channel; an indication of a periodic schedule associated with providing measurement reports from a medium access control entity to an RLC entity; or a threshold associated with a number of UEs that indicate a need for the retransmission.

Aspect 6: The method of any of Aspects 1-5, wherein the retransmission is at least one of: an RLC service data unit (SDU) level retransmission, an RLC protocol data unit (PDU) level retransmission, or an RLC encoded packet level transmission.

Aspect 7: The method of any of Aspects 1-6, wherein the first set of encoded packets are associated with a set of RLC protocol data units (PDUs), wherein the set of RLC PDUs are associated with a single RLC service data unit (SDU), and wherein a header of an RLC PDU, of the set of RLC PDUs, indicates: a first sequence number indicating the single RLC SDU associated with the RLC PDU, a second sequence number indicating an encoded packet, of the first set of encoded packets, associated with the RLC PDU, and a segmentation index identifying a segmentation associated with the RLC PDU.

Aspect 8: The method of Aspect 7, wherein receiving the initial transmission comprises: receiving the RLC PDU indicating the first sequence number, the second sequence number, and the segmentation index; failing to receive another RLC PDU, from the set of RLC PDUs, indicating the first sequence number, the second sequence number, and another segmentation index; and determining that the encoded packet associated with the second sequence number is not successfully received by the UE.

Aspect 9: The method of any of Aspects 7-8, wherein receiving the initial transmission comprises: receiving the set of RLC PDUs, wherein receiving the set of RLC PDUs includes successfully receiving a first subset of encoded packets, from the first set of encoded packets, and failing to receive a second subset of encoded packets, from the first set of encoded packets.

Aspect 10: The method of Aspect 9, further comprising: detecting a decoding failure if a number of encoded packets included in the first subset of encoded packets is less than a third threshold, wherein the third threshold is based at least in part on a number of source packets associated with the first set of encoded packets.

Aspect 11: The method of any of Aspects 9-10, further comprising: decoding the first subset of encoded packets to obtain a set of source packets associated with the first set of encoded packets, wherein the single RLC SDU is obtained from the set of source packets.

Aspect 12: The method of any of Aspects 9-11, wherein the configuration information indicates a fourth threshold associated with a number of received encoded packets, further comprising: decoding the first subset of encoded packets to obtain a set of source packets associated with the first set of encoded packets; and reassembling the set of source packets to obtain the single RLC SDU based at least in part on a number of encoded packets included in the first subset of encoded packets satisfying the fourth threshold.

Aspect 13: The method of any of Aspects 9-12, further comprising: decoding the first subset of encoded packets to obtain a set of source packets associated with the first set of encoded packets and successfully obtaining the single RLC SDU from the set of source packets; and refraining from receiving additional encoded packets associated with the single RLC SDU in the initial transmission based at least in part on successfully obtaining the single RLC SDU.

Aspect 14: The method of any of Aspects 1-13, wherein transmitting the RLC status feedback message comprises: transmitting an RLC status protocol data unit (PDU) indicating at least one of: an acknowledgement (ACK) sequence number, wherein the ACK sequence number indicates that service data unit (SDU) sequence numbers, associated with the initial transmission, less than the ACK sequence number were successfully received by the UE; a first negative ACK (NACK) sequence number, wherein the first NACK sequence number indicates an RLC SDU, associated with the initial transmission, that was not successfully received by the UE; the first NACK sequence number and an indication of a number of additional encoded packets needed to successfully decode the RLC SDU indicated by the NACK sequence number; the first NACK sequence number and an indication of a number of encoded packets from the first set of encoded packets, associated with the RLC SDU indicated by the NACK sequence number, that were successfully received by the UE; the first NACK sequence number and a second NACK sequence number, wherein the second NACK sequence number indicates an encoded packet, associated with the RLC SDU, that was not successfully received by the UE; the first NACK sequence number, the second NACK sequence number, and a NACK segmentation index, wherein the NACK segmentation index indicates an RLC PDU, associated with the RLC SDU and the encoded packet, that was not successfully received by the UE; or a rate adjustment command.

Aspect 15: The method of any of Aspects 1-14, wherein the retransmission is an RLC service data unit (SDU) level retransmission, wherein the RLC status feedback message indicates one or more RLC SDUs that were not successfully received by the UE, and wherein receiving the retransmission comprises: receiving the second set of encoded packets, wherein the second set of encoded packets are generated from the one or more RLC SDUs indicated by the RLC status feedback message; and decoding the second set of encoded packets to obtain the one or more RLC SDUs based at least in part on the first set of encoded packets and the second set of encoded packets.

Aspect 16: The method of any of Aspects 1-14, wherein the retransmission is an RLC protocol data unit (PDU) level retransmission, wherein the RLC status feedback message indicates one or more RLC PDUs or one or more encoded packets that were not successfully received by the UE; and wherein receiving the retransmission comprises: receiving the second set of encoded packets, wherein the second set of encoded packets are generated from the one or more RLC PDUs or the one or more encoded packets indicated by the RLC status feedback message; and decoding the second set of encoded packets to obtain the one or more RLC PDUs based at least in part on the first set of encoded packets and the second set of encoded packets.

Aspect 17: The method of any of Aspects 1-14, wherein the retransmission is an RLC encoded packet level retransmission, wherein the RLC status feedback message indicates an RLC service data unit (SDU) that was not successfully received by the UE and indicates a number of additional encoded packets needed to successfully decode the RLC SDU, and wherein receiving the retransmission comprises: receiving the second set of encoded packets, wherein a number of encoded packets included in the second set of encoded packets is based at least in part on the number of additional encoded packets needed to successfully decode the RLC SDU; and decoding encoded packets, included in the first set of encoded packets and the second set of encoded packets, that include a sequence number associated with the RLC SDU in a header of the encoded packets, to obtain the RLC SDU.

Aspect 18: The method of any of Aspects 1-17, wherein transmitting the RLC status feedback message comprises: transmitting the RLC status feedback message in accordance with a periodic schedule.

Aspect 19: The method of any of Aspects 1-18, wherein transmitting the RLC status feedback message comprises: receiving, from an RLC entity, a request for the RLC status feedback message; and transmitting the RLC status feedback message based at least in part on receiving the request.

Aspect 20: The method of any of Aspects 1-19, further comprising: reporting, from a medium access control (MAC) entity to an RLC entity, a measurement report indicating one or more measurement values, wherein the one or more measurement values are used for MBS channel selection between the multicast traffic channel or the dedicated traffic channel, and wherein the measurement report is a periodic measurement report or an aperiodic measurement report.

Aspect 21: The method of any of Aspects 1-20, wherein the RLC status feedback message indicates a number of additional encoded packets needed to successfully decode an RLC service data unit (SDU), and wherein the number of additional encoded packets is used for MBS channel selection between the multicast traffic channel or the dedicated traffic channel.

Aspect 22: A method of wireless communication performed by a base station, comprising: transmitting configuration information indicating that network coding is enabled for initial transmissions associated with a multicast/broadcast service (MBS) and indicating that network coding is enabled for retransmissions associated with the MBS; transmitting, via a multicast traffic channel or a dedicated traffic channel, an initial transmission associated with the MBS, wherein the initial transmission includes a first set of encoded packets; receiving a radio link control (RLC) status feedback message associated with the initial transmission; and transmitting, via the multicast traffic channel or the dedicated traffic channel, a retransmission associated with the initial transmission, wherein the retransmission includes a second set of encoded packets.

Aspect 23: The method of Aspect 22, further comprising: receiving a measurement report indicating one or more measurement values, wherein the initial transmission is received via the multicast traffic channel if the one or more measurement values satisfy a first threshold, or is received via the dedicated traffic channel if the one or more measurement values do not satisfy the first threshold.

Aspect 24: The method of any of Aspects 22-23, wherein transmitting the initial transmission comprises transmitting the initial transmission via the multicast traffic channel, and wherein transmitting the retransmission comprises transmitting the retransmission via the dedicated traffic channel.

Aspect 25: The method of any of Aspects 22-24, wherein transmitting the initial transmission comprises transmitting the initial transmission via the multicast traffic channel; and wherein the retransmission is transmitted via the multicast traffic channel if a number of UEs associated with the initial transmission that indicate a need for the retransmission satisfies a second threshold, or is transmitted via the dedicated traffic channel if the number of UEs does not satisfy the second threshold.

Aspect 26: The method of any of Aspects 22-25, wherein the configuration information indicates at least one of: one or more thresholds associated with MBS channel selection between the multicast traffic channel or the dedicated traffic channel; an indication of a periodic schedule associated with providing measurement reports from a medium access control entity to an RLC entity; or a threshold associated with a number of UEs that indicate a need for the retransmission.

Aspect 27: The method of any of Aspects 22-26, wherein the retransmission is at least one of: an RLC service data unit (SDU) level retransmission, an RLC protocol data unit (PDU) level retransmission, or an RLC encoded packet level transmission.

Aspect 28: The method of any of Aspects 22-27, wherein the first set of encoded packets are associated with a set of RLC protocol data units (PDUs), wherein the set of RLC PDUs are associated with a single RLC service data unit (SDU), and wherein a header of an RLC PDU, of the set of RLC PDUs, indicates: a first sequence number indicating the single RLC SDU associated with the RLC PDU, a second sequence number indicating an encoded packet, of the first set of encoded packets, associated with the RLC PDU, and a segmentation index identifying a segmentation associated with the RLC PDU.

Aspect 29: The method of Aspect 28, wherein transmitting the initial transmission comprises: generating a set of source packets from the single RLC SDU; performing network coding to generate the first set of encoded packets from the set of source packets; segmenting at least one encoded packet of the first set of encoded packets into a first segmented encoded packet and a second segmented encoded packet; and adding a first header to the first segmented encoded packet to form the RLC PDU, wherein the header indicates the first sequence number, the second sequence number, and the segmentation index; and adding a second header to the second segmented encoded packet to form another RLC PDU, wherein the header indicates the first sequence number, the second sequence number, and another segmentation index.

Aspect 30: The method of any of Aspects 22-29, wherein receiving the RLC status feedback message comprises: receiving, from a user equipment (UE), an RLC status protocol data unit (PDU) indicating at least one of: an acknowledgement (ACK) sequence number, wherein the ACK sequence number indicates that service data unit (SDU) sequence numbers, associated with the initial transmission, less than the ACK sequence number were successfully received by the UE; a first negative ACK (NACK) sequence number, wherein the first NACK sequence number indicates an RLC SDU, associated with the initial transmission, that was not successfully received by the UE; the first NACK sequence number and an indication of a number of additional encoded packets needed to successfully decode the RLC SDU indicated by the NACK sequence number; the first NACK sequence number and an indication of a number of encoded packets from the first set of encoded packets, associated with the RLC SDU indicated by the NACK sequence number, that were successfully received by the UE; the first NACK sequence number and a second NACK sequence number, wherein the second NACK sequence number indicates an encoded packet, associated with the RLC SDU, that was not successfully received by the UE; the first NACK sequence number, the second NACK sequence number, and a NACK segmentation index, wherein the NACK segmentation index indicates an RLC PDU, associated with the RLC SDU and the encoded packet, that was not successfully received by the UE; or a rate adjustment command.

Aspect 31: The method of any of Aspects 22-30, wherein the retransmission is an RLC service data unit (SDU) level retransmission, wherein the RLC status feedback message indicates one or more RLC SDUs that were not successfully received, and wherein transmitting the retransmission comprises: generating the second set of encoded packets using the one or more RLC SDUs as systematic source packets; and transmitting the second set of encoded packets.

Aspect 32: The method of any of Aspects 22-30, wherein the retransmission is an RLC protocol data unit (PDU) level retransmission, wherein the RLC status feedback message indicates one or more RLC PDUs that were not successfully received; and wherein transmitting the retransmission comprises: generating the second set of encoded packets using the one or more RLC PDUs as systematic source packets; and transmitting the second set of encoded packets.

Aspect 33: The method of any of Aspects 22-32, further comprising: generating a third set of encoded packets associated with an RLC service data unit (SDU), wherein the first set of encoded packets are a subset of the third set of encoded packets.

Aspect 34: The method of Aspect 33, wherein the retransmission is an RLC encoded packet level retransmission, wherein the RLC status feedback message indicates that the RLC SDU was not successfully received and indicates a number of additional encoded packets needed to successfully decode the RLC SDU, and wherein transmitting the retransmission comprises: transmitting the second set of encoded packets, wherein a number of encoded packets included in the second set of encoded packets is based at least in part on the number of additional encoded packets needed to successfully decode the RLC SDU.

Aspect 35: The method of any of Aspects 22-34, wherein receiving the RLC status feedback message comprises: receiving the RLC status feedback message in accordance with a periodic schedule.

Aspect 36: The method of any of Aspects 22-35, wherein receiving the RLC status feedback message comprises: transmitting a request for the RLC status feedback message; and receiving the RLC status feedback message based at least in part on transmitting the request.

Aspect 37: The method of any of Aspects 22-36, further comprising: receiving, from one or more user equipments (UEs) associated with the MBS, a measurement report indicating one or more measurement values, wherein the one or more measurement values are used for MBS channel selection between the multicast traffic channel or the dedicated traffic channel, and wherein the measurement report is a periodic measurement report or an aperiodic measurement report.

Aspect 38: The method of any of Aspects 22-37, wherein the RLC status feedback message indicates a number of additional encoded packets needed to successfully decode an RLC service data unit (SDU), and wherein the number of additional encoded packets is used for MBS channel selection between the multicast traffic channel or the dedicated traffic channel.

Aspect 39: An apparatus for wireless communication at a device, comprising a processor; memory coupled with the processor; and instructions stored in the memory and executable by the processor to cause the apparatus to perform the method of one or more of Aspects 1-21.

Aspect 40: A device for wireless communication, comprising a memory and one or more processors coupled to the memory, the one or more processors configured to perform the method of one or more of Aspects 1-21.

Aspect 41: An apparatus for wireless communication, comprising at least one means for performing the method of one or more of Aspects 1-21.

Aspect 42: A non-transitory computer-readable medium storing code for wireless communication, the code comprising instructions executable by a processor to perform the method of one or more of Aspects 1-21.

Aspect 43: A non-transitory computer-readable medium storing a set of instructions for wireless communication, the set of instructions comprising one or more instructions that, when executed by one or more processors of a device, cause the device to perform the method of one or more of Aspects 1-21.

Aspect 44: An apparatus for wireless communication at a device, comprising a processor; memory coupled with the processor; and instructions stored in the memory and executable by the processor to cause the apparatus to perform the method of one or more of Aspects 22-38.

Aspect 45: A device for wireless communication, comprising a memory and one or more processors coupled to the memory, the one or more processors configured to perform the method of one or more of Aspects 22-38.

Aspect 46: An apparatus for wireless communication, comprising at least one means for performing the method of one or more of Aspects 22-38.

Aspect 47: A non-transitory computer-readable medium storing code for wireless communication, the code comprising instructions executable by a processor to perform the method of one or more of Aspects 22-38.

Aspect 48: A non-transitory computer-readable medium storing a set of instructions for wireless communication, the set of instructions comprising one or more instructions that, when executed by one or more processors of a device, cause the device to perform the method of one or more of Aspects 22-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, from a base station, configuration information indicating that network coding is enabled for initial transmissions associated with a multicast/broadcast service (MBS) and indicating that network coding is enabled for retransmissions associated with the MBS;
receive, via a multicast traffic channel or a dedicated traffic channel, an initial transmission associated with the MBS, wherein the initial transmission is associated with a first set of encoded packets;
transmit, based at least in part on decoding the initial transmission, a radio link control (RLC) status feedback message associated with the initial transmission; and
receive, via the multicast traffic channel or the dedicated traffic channel, a retransmission associated with the initial transmission, wherein the retransmission is associated with a second set of encoded packets.

2. The UE of claim 1, wherein the one or more processors, to receive the initial transmission, are configured to receive the initial transmission via the multicast traffic channel, and wherein the one or more processors, to receive the retransmission, are configured to receive the retransmission via the dedicated traffic channel.

3. The UE of claim 1, wherein the retransmission is at least one of:
an RLC service data unit (SDU) level retransmission,
an RLC protocol data unit (PDU) level retransmission, or
an RLC encoded packet level transmission.

4. The UE of claim 1, wherein the first set of encoded packets are associated with a set of RLC protocol data units (PDUs), wherein the set of RLC PDUs are associated with a single RLC service data unit (SDU), and wherein a header of an RLC PDU, of the set of RLC PDUs, indicates:
a first sequence number indicating the single RLC SDU associated with the RLC PDU, a second sequence number indicating an encoded packet, of the first set of encoded packets, associated with the RLC PDU, and a segmentation index identifying a segmentation associated with the RLC PDU.

5. The UE of claim 4, wherein the configuration information indicates a threshold associated with a number of received encoded packets, and wherein the one or more processors, to receive the initial transmission, are configured to:

receive a set of RLC packet data units (PDUs), wherein receiving the set of RLC PDUs includes successfully receiving a first subset of encoded packets, from the first set of encoded packets, and failing to receive a second subset of encoded packets, from the first set of encoded packets;

decode the first subset of encoded packets to obtain a set of source packets associated with the first set of encoded packets; and reassemble the set of source packets to obtain a single RLC service data unit (SDU) based at least in part on a number of encoded packets included in the first subset of encoded packets satisfying the threshold.

6. The UE of claim 4, wherein the one or more processors, to receive the initial transmission, are configured to:

receive a set of RLC packet data units (PDUs), wherein receiving the set of RLC PDUs includes successfully receiving a first subset of encoded packets, from the first set of encoded packets, and failing to receive a second subset of encoded packets, from the first set of encoded packets;

decode the first subset of encoded packets to obtain a set of source packets associated with the first set of encoded packets and successfully obtaining a single RLC service data unit (SDU) from the set of source packets; and refrain from receiving additional encoded packets associated with the single RLC SDU in the initial transmission based at least in part on successfully obtaining the single RLC SDU.

7. The UE of claim 1, wherein the one or more processors, to transmit the RLC status feedback message, are configured to:

transmit an RLC status protocol data unit (PDU) indicating at least one of:

an acknowledgement (ACK) sequence number, wherein the ACK sequence number indicates that service data unit (SDU) sequence numbers, associated with the initial transmission, less than the ACK sequence number were successfully received by the UE;

a first negative ACK (NACK) sequence number, wherein the first NACK sequence number indicates an RLC SDU, associated with the initial transmission, that was not successfully received by the UE;

the first NACK sequence number and an indication of a number of additional encoded packets needed to successfully decode the RLC SDU indicated by the NACK sequence number;

the first NACK sequence number and an indication of a number of encoded packets from the first set of encoded packets, associated with the RLC SDU indicated by the NACK sequence number, that were successfully received by the UE;

the first NACK sequence number and a second NACK sequence number, wherein the second NACK sequence number indicates an encoded packet, associated with the RLC SDU, that was not successfully received by the UE;

the first NACK sequence number, the second NACK sequence number, and a NACK segmentation index, wherein the NACK segmentation index indicates an RLC PDU, associated with the RLC SDU and the encoded packet, that was not successfully received by the UE; or a rate adjustment command.

8. The UE of claim 1, wherein the retransmission is an RLC service data unit (SDU) level retransmission, wherein the RLC status feedback message indicates one or more RLC SDUs that were not successfully received by the UE, and wherein the one or more processors, to receive the retransmission, are configured to:

receive the second set of encoded packets, wherein the second set of encoded packets are generated from the one or more RLC SDUs indicated by the RLC status feedback message; and decode the second set of encoded packets to obtain the one or more RLC SDUs based at least in part on the first set of encoded packets and the second set of encoded packets.

9. The UE of claim 1, wherein the retransmission is an RLC protocol data unit (PDU) level retransmission, wherein the RLC status feedback message indicates one or more RLC PDUs or one or more encoded packets that were not successfully received by the UE; and wherein the one or more processors, to receive the retransmission, are configured to:

receive the second set of encoded packets, wherein the second set of encoded packets are generated from the one or more RLC PDUs or the one or more encoded packets indicated by the RLC status feedback message; and decode the second set of encoded packets to obtain the one or more RLC PDUs based at least in part on the first set of encoded packets and the second set of encoded packets.

10. The UE of claim 1, wherein the retransmission is an RLC encoded packet level retransmission, wherein the RLC status feedback message indicates an RLC service data unit (SDU) that was not successfully received by the UE and indicates a number of additional encoded packets needed to successfully decode the RLC SDU, and wherein the one or more processors, to receive the retransmission, are configured to:

receive the second set of encoded packets, wherein a number of encoded packets included in the second set of encoded packets is based at least in part on the number of additional encoded packets needed to successfully decode the RLC SDU; and decode encoded packets, included in the first set of encoded packets and the second set of encoded packets, that include a sequence number associated with the RLC SDU in a header of the encoded packets, to obtain the RLC SDU.

11. A base station for wireless communication, comprising:

a memory; and one or more processors, coupled to the memory, configured to:

transmit configuration information indicating that network coding is enabled for initial transmissions associated with a multicast/broadcast service (MBS)

and indicating that network coding is enabled for retransmissions associated with the MBS;

transmit, via a multicast traffic channel or a dedicated traffic channel, an initial transmission associated with the MBS, wherein the initial transmission includes a first set of encoded packets;

receive a radio link control (RLC) status feedback message associated with the initial transmission; and transmit, via the multicast traffic channel or the dedicated traffic channel, a retransmission associated with the initial transmission, wherein the retransmission includes a second set of encoded packets.

12. The base station of claim 11, wherein the one or more processors, to transmit the initial transmission, are configured to:

generate a set of source packets from a single RLC service data unit (SDU);

perform network coding to generate the first set of encoded packets from the set of source packets;

segment at least one encoded packet of the first set of encoded packets into a first segmented encoded packet and a second segmented encoded packet; and add a first header to the first segmented encoded packet to form an RLC packet data unit (PDU), wherein the header indicates a first sequence number, a second sequence number, and a segmentation index; and add a second header to the second segmented encoded packet to form another RLC PDU, wherein the header indicates the first sequence number, the second sequence number, and another segmentation index.

13. The base station of claim 11, wherein the retransmission is an RLC service data unit (SDU) level retransmission, wherein the RLC status feedback message indicates one or more RLC SDUs that were not successfully received, and wherein the one or more processors, to transmit the retransmission, are configured to:

generate the second set of encoded packets using the one or more RLC SDUs as systematic source packets; and transmit the second set of encoded packets.

14. The base station of claim 11, wherein the retransmission is an RLC protocol data unit (PDU) level retransmission, wherein the RLC status feedback message indicates one or more RLC PDUs that were not successfully received; and wherein the one or more processors, to transmit the retransmission, are configured to:

generate the second set of encoded packets using the one or more RLC PDUs as systematic source packets; and transmit the second set of encoded packets.

15. The base station of claim 11, wherein the one or more processors are further configured to:

generate a third set of encoded packets associated with an RLC service data unit (SDU), wherein the first set of encoded packets are a subset of the third set of encoded packets, and wherein the retransmission is an RLC encoded packet level retransmission, wherein the RLC status feedback message indicates that the RLC SDU was not successfully received and indicates a number of additional encoded packets needed to successfully decode the RLC SDU, and wherein transmitting the retransmission comprises:

transmit the second set of encoded packets, wherein a number of encoded packets included in the second set of encoded packets is based at least in part on the number of additional encoded packets needed to successfully decode the RLC SDU.

16. A method of wireless communication performed by a user equipment (UE), comprising:

receiving, from a base station, configuration information indicating that network coding is enabled for initial transmissions associated with a multicast/broadcast service (MBS) and indicating that network coding is enabled for retransmissions associated with the MBS;

receiving, via a multicast traffic channel or a dedicated traffic channel, an initial transmission associated with the MBS, wherein the initial transmission is associated with a first set of encoded packets;

transmitting, based at least in part on decoding the initial transmission, a radio link control (RLC) status feedback message associated with the initial transmission; and receiving, via the multicast traffic channel or the dedicated traffic channel, a retransmission associated with the initial transmission, wherein the retransmission is associated with a second set of encoded packets.

17. The method of claim 16, wherein receiving the initial transmission comprises receiving the initial transmission via the multicast traffic channel, and wherein receiving the retransmission comprises receiving the retransmission via the dedicated traffic channel.

18. The method of claim 16, wherein the retransmission is at least one of:

an RLC service data unit (SDU) level retransmission, an RLC protocol data unit (PDU) level retransmission, or an RLC encoded packet level transmission.

19. The method of claim 16, wherein the first set of encoded packets are associated with a set of RLC protocol data units (PDUs), wherein the set of RLC PDUs are associated with a single RLC service data unit (SDU), and wherein a header of an RLC PDU, of the set of RLC PDUs, indicates:

a first sequence number indicating the single RLC SDU associated with the RLC PDU, a second sequence number indicating an encoded packet, of the first set of encoded packets, associated with the RLC PDU, and a segmentation index identifying a segmentation associated with the RLC PDU.

20. The method of claim 19, wherein the configuration information indicates a threshold associated with a number of received encoded packets, and wherein receiving the initial transmission comprises:

receiving a set of RLC packet data units (PDUs), wherein receiving the set of RLC PDUs includes successfully receiving a first subset of encoded packets, from the first set of encoded packets, and failing to receive a second subset of encoded packets, from the first set of encoded packets;

decoding the first subset of encoded packets to obtain a set of source packets associated with the first set of encoded packets; and reassembling the set of source packets to obtain a single RLC service data unit (SDU) based at least in part on a number of encoded packets included in the first subset of encoded packets satisfying the threshold.

21. The method of claim 19, wherein receiving the initial transmission comprises:

receiving a set of RLC packet data units (PDUs), wherein receiving the set of RLC PDUs includes successfully receiving a first subset of encoded packets, from the first set of encoded packets, and failing to receive a second subset of encoded packets, from the first set of encoded packets;

decoding the first subset of encoded packets to obtain a set of source packets associated with the first set of encoded packets and successfully obtaining a single RLC service data unit (SDU) from the set of source packets; and refraining from receiving additional encoded packets associated with the single RLC SDU in the initial transmission based at least in part on successfully obtaining the single RLC SDU.

22. The method of claim 16, wherein transmitting the RLC status feedback message comprises:

transmitting an RLC status protocol data unit (PDU) indicating at least one of:

an acknowledgement (ACK) sequence number, wherein the ACK sequence number indicates that service data unit (SDU) sequence numbers, associated with the initial transmission, less than the ACK sequence number were successfully received by the UE;

a first negative ACK (NACK) sequence number, wherein the first NACK sequence number indicates an RLC SDU, associated with the initial transmission, that was not successfully received by the UE;

the first NACK sequence number and an indication of a number of additional encoded packets needed to successfully decode the RLC SDU indicated by the NACK sequence number;

the first NACK sequence number and an indication of a number of encoded packets from the first set of encoded packets, associated with the RLC SDU indicated by the NACK sequence number, that were successfully received by the UE;

the first NACK sequence number and a second NACK sequence number, wherein the second NACK sequence number indicates an encoded packet, associated with the RLC SDU, that was not successfully received by the UE;

the first NACK sequence number, the second NACK sequence number, and a NACK segmentation index, wherein the NACK segmentation index indicates an RLC PDU, associated with the RLC SDU and the encoded packet, that was not successfully received by the UE; or a rate adjustment command.

23. The method of claim 16, wherein the retransmission is an RLC service data unit (SDU) level retransmission, wherein the RLC status feedback message indicates one or more RLC SDUs that were not successfully received by the UE, and wherein receiving the retransmission comprises:

receiving the second set of encoded packets, wherein the second set of encoded packets are generated from the one or more RLC SDUs indicated by the RLC status feedback message; and decoding the second set of encoded packets to obtain the one or more RLC SDUs based at least in part on the first set of encoded packets and the second set of encoded packets.

24. The method of claim 16, wherein the retransmission is an RLC protocol data unit (PDU) level retransmission, wherein the RLC status feedback message indicates one or more RLC PDUs or one or more encoded packets that were not successfully received by the UE; and wherein receiving the retransmission comprises:

receiving the second set of encoded packets, wherein the second set of encoded packets are generated from the one or more RLC PDUs or the one or more encoded packets indicated by the RLC status feedback message; and decoding the second set of encoded packets to obtain the one or more RLC PDUs based at least in part on the first set of encoded packets and the second set of encoded packets.

25. The method of claim 16, wherein the retransmission is an RLC encoded packet level retransmission, wherein the RLC status feedback message indicates an RLC service data unit (SDU) that was not successfully received by the UE and indicates a number of additional encoded packets needed to successfully decode the RLC SDU, and wherein receiving the retransmission comprises:

receiving the second set of encoded packets, wherein a number of encoded packets included in the second set of encoded packets is based at least in part on the number of additional encoded packets needed to successfully decode the RLC SDU; and decoding encoded packets, included in the first set of encoded packets and the second set of encoded packets, that include a sequence number associated with the RLC SDU in a header of the encoded packets, to obtain the RLC SDU.

26. A method of wireless communication performed by a base station, comprising:

transmitting configuration information indicating that network coding is enabled for initial transmissions associated with a multicast/broadcast service (MBS) and indicating that network coding is enabled for retransmissions associated with the MBS;

transmitting, via a multicast traffic channel or a dedicated traffic channel, an initial transmission associated with the MBS, wherein the initial transmission includes a first set of encoded packets;

receiving a radio link control (RLC) status feedback message associated with the initial transmission; and transmitting, via the multicast traffic channel or the dedicated traffic channel, a retransmission associated with the initial transmission, wherein the retransmission includes a second set of encoded packets.

27. The method of claim 26, wherein transmitting the initial transmission comprises:

generating a set of source packets from a single RLC service data unit (SDU);

performing network coding to generate the first set of encoded packets from the set of source packets;

segmenting at least one encoded packet of the first set of encoded packets into a first segmented encoded packet and a second segmented encoded packet; and adding a first header to the first segmented encoded packet to form an RLC packet data unit (PDU), wherein the header indicates a first sequence number, a second sequence number, and a segmentation index; and adding a second header to the second segmented encoded packet to form another RLC PDU, wherein the header indicates the first sequence number, the second sequence number, and another segmentation index.

28. The method of claim 26, wherein the retransmission is an RLC service data unit (SDU) level retransmission, wherein the RLC status feedback message indicates one or more RLC SDUs that were not successfully received, and wherein transmitting the retransmission comprises:

generating the second set of encoded packets using the one or more RLC SDUs as systematic source packets; and transmitting the second set of encoded packets.

29. The method of claim 26, wherein the retransmission is an RLC protocol data unit (PDU) level retransmission, wherein the RLC status feedback message indicates one or more RLC PDUs that were not successfully received; and
wherein transmitting the retransmission comprises:

generating the second set of encoded packets using the one or more RLC PDUs as systematic source packets; and transmitting the second set of encoded packets.

30. The method of claim 26, further comprising:

generating a third set of encoded packets associated with an RLC service data unit (SDU), wherein the first set of encoded packets are a subset of the third set of encoded packets, and wherein the retransmission is an RLC encoded packet level retransmission, wherein the RLC status feedback message indicates that the RLC SDU was not successfully received and indicates a number of additional encoded packets needed to successfully decode the RLC SDU, and wherein transmitting the retransmission comprises:

transmitting the second set of encoded packets, wherein a number of encoded packets included in the second set of encoded packets is based at least in part on the number of additional encoded packets needed to successfully decode the RLC SDU.

\* \* \* \* \*